United States Patent
Tokunaga et al.

(10) Patent No.: US 10,248,846 B2
(45) Date of Patent: Apr. 2, 2019

(54) INFORMATION PROCESSING DEVICE

(71) Applicant: SONY INTERACTIVE ENTERTAINMENT INC., Tokyo (JP)

(72) Inventors: Nodoka Tokunaga, Tokyo (JP); Keigo Tamura, Tokyo (JP); Yoshihiko Suwa, Kanagawa (JP); Shoichi Ikenoue, Chiba (JP); Tomohiro Ogawa, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 124 days.

(21) Appl. No.: 15/325,231

(22) PCT Filed: Mar. 16, 2015

(86) PCT No.: PCT/JP2015/057740
§ 371 (c)(1),
(2) Date: Jan. 10, 2017

(87) PCT Pub. No.: WO2016/013249
PCT Pub. Date: Jan. 28, 2016

(65) Prior Publication Data
US 2017/0169287 A1    Jun. 15, 2017

(30) Foreign Application Priority Data

Jul. 24, 2014 (JP) ................................. 2014-151129

(51) Int. Cl.
*H04L 29/06* (2006.01)
*G06K 9/00* (2006.01)
(Continued)

(52) U.S. Cl.
CPC ..... *G06K 9/00288* (2013.01); *G06F 17/3028* (2013.01); *G06F 17/30247* (2013.01);
(Continued)

(58) Field of Classification Search
CPC .................................................. G06K 9/00288
See application file for complete search history.

(56) References Cited

U.S. PATENT DOCUMENTS

| 8,368,555 | B2* | 2/2013 | Gilbert | G01D 4/008 307/29 |
| 9,747,496 | B2* | 8/2017 | Suzuki | G06K 9/00362 |

(Continued)

FOREIGN PATENT DOCUMENTS

| JP | 9-147110 A | 6/1997 |
| JP | 09-147110 A | 6/1997 |

(Continued)

OTHER PUBLICATIONS

International Search Report and Written Opinion dated May 26, 2015, from the corresponding PCT/JP2015/057740.

(Continued)

*Primary Examiner* — Shawnchoy Rahman
(74) *Attorney, Agent, or Firm* — Katten Muchin Rosenman LLP

(57) ABSTRACT

An image obtaining section 106 obtains an imaged image from an imaging device. A face authenticating section 132 detects a face image of a registered user present in the imaged image using face identifying data retained in a registered user information retaining section 180. A damage determining section 142 determines whether or not the face identifying data read from the registered user information retaining section 180 by a face data reading section 130 is damaged. If the face identifying data is determined to be damaged, a notifying section 144 notifies that the face identifying data is damaged.

6 Claims, 17 Drawing Sheets

(51) Int. Cl.
*G06F 21/32* (2013.01)
*G06F 17/30* (2006.01)

(52) U.S. Cl.
CPC ......... *G06F 21/32* (2013.01); *G06K 9/00912* (2013.01); *H04L 63/0861* (2013.01); *H04L 67/38* (2013.01)

(56) References Cited

U.S. PATENT DOCUMENTS

| | | |
|---|---|---|
| 2005/0105109 A1 | 5/2005 | Kikuchi |
| 2009/0060293 A1 | 3/2009 | Nagao et al. |
| 2010/0208950 A1 | 8/2010 | Silvester |
| 2013/0047232 A1* | 2/2013 | Tuchman ............... H04L 9/3226 726/7 |
| 2013/0169839 A1* | 7/2013 | Takahashi ................ H04N 5/76 348/231.99 |
| 2014/0254862 A1* | 9/2014 | Sobczak ................. G06T 5/009 382/100 |
| 2015/0043818 A1* | 2/2015 | Kim ........................ G06T 5/009 382/167 |

FOREIGN PATENT DOCUMENTS

| | | |
|---|---|---|
| JP | 2000-137818 A | 5/2000 |
| JP | 2002-032755 A | 1/2002 |
| JP | 2004-240632 A | 8/2004 |
| JP | 2005-129043 A | 5/2005 |
| JP | 2005-242677 A | 9/2005 |
| JP | 2007-226327 A | 9/2007 |
| JP | 2010-067008 A | 3/2010 |
| JP | 2010208950 | 9/2010 |
| JP | 2013-161104 A | 8/2013 |
| WO | 2010/140191 A1 | 12/2010 |

OTHER PUBLICATIONS

International Preliminary Report on Patentability dated Aug. 23, 2016, from the corresponding PCT/JP2015/057740.

Office Action dated Nov. 29, 2016, from the corresponding Japanese Patent Application No. 2016-535811.

* cited by examiner

FIG.2
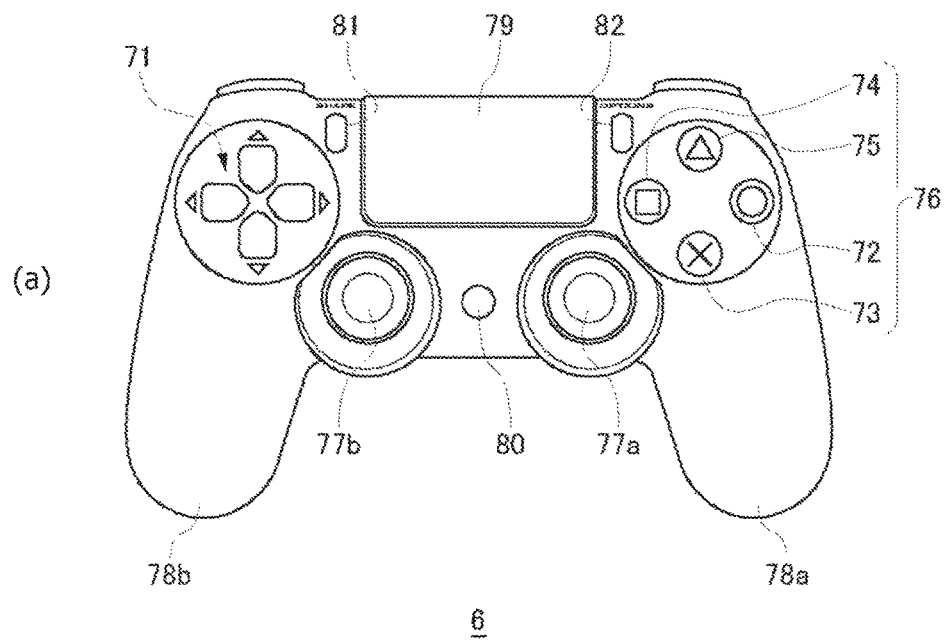
(a)
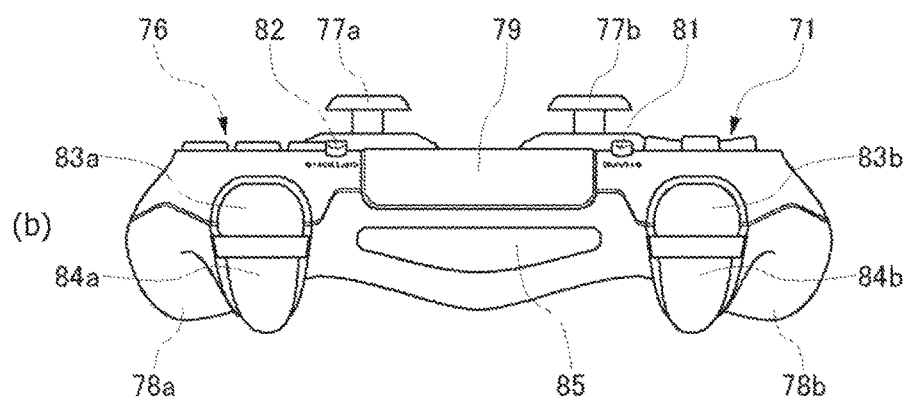
(b)

FIG. 6
(a)
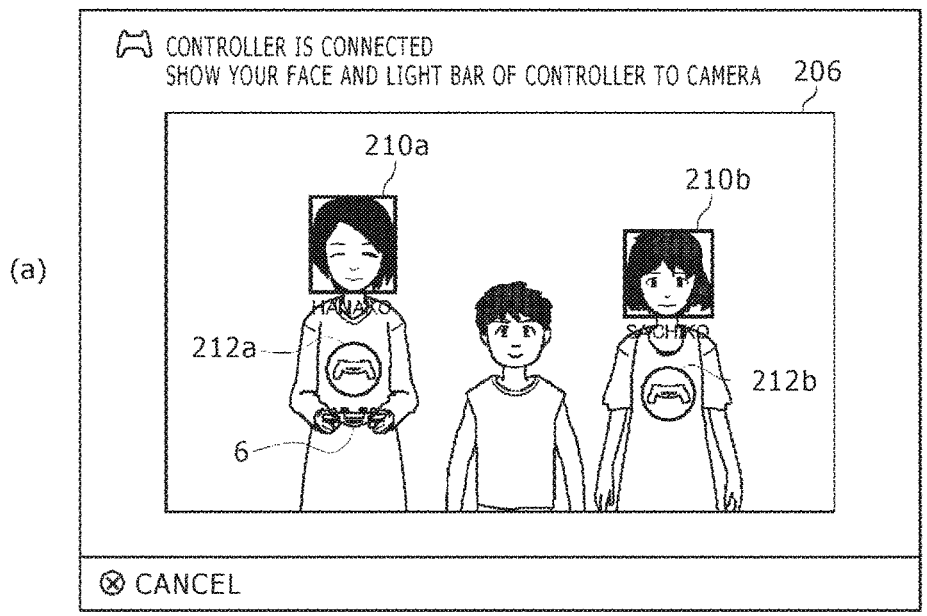
(b)
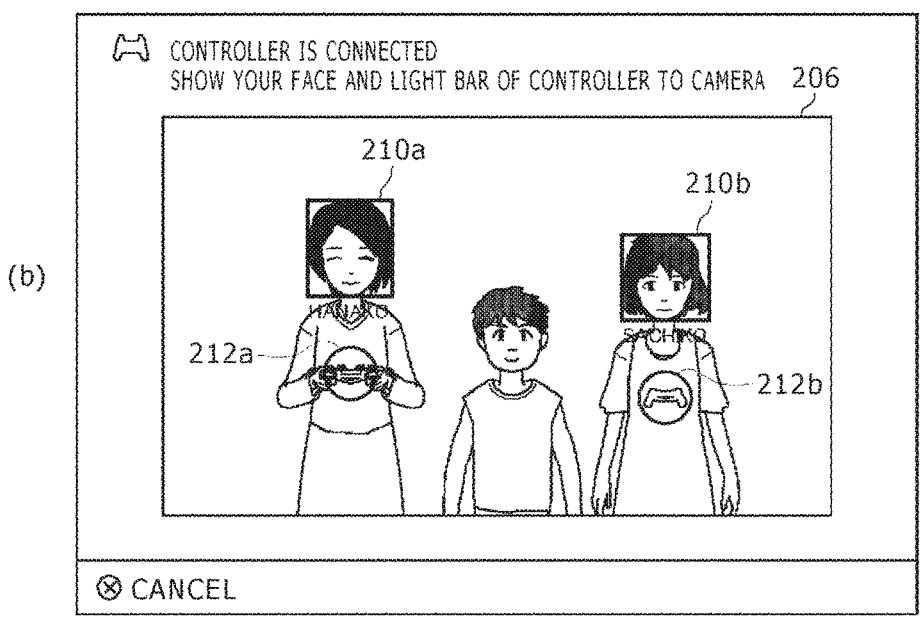

FIG.7
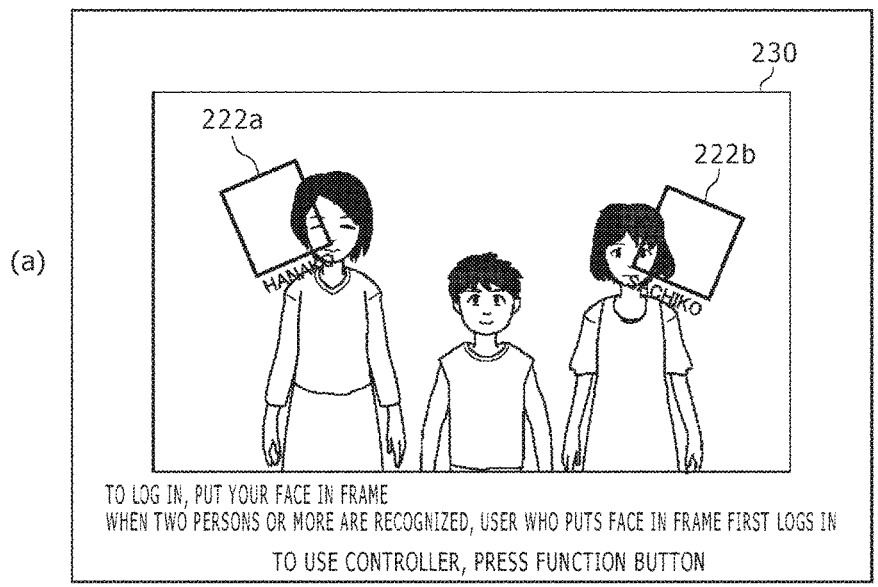
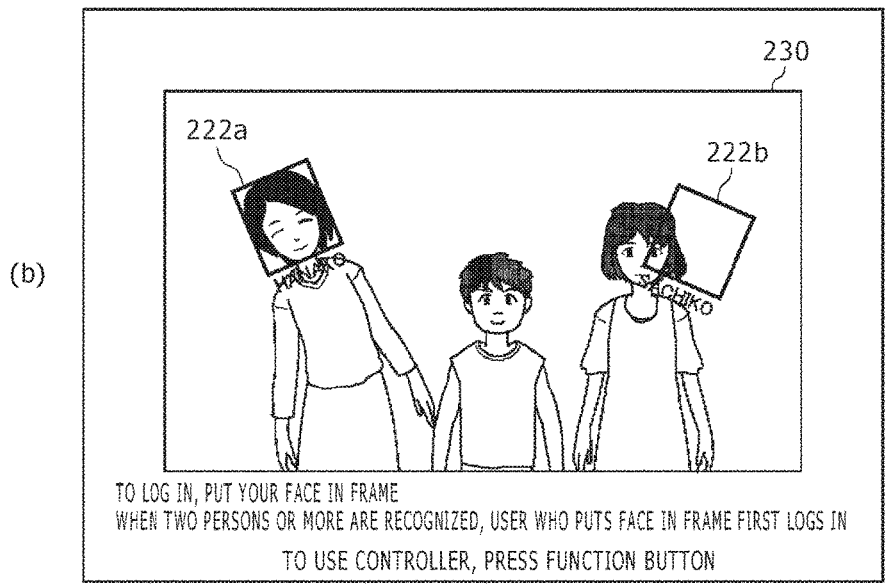

FIG. 9
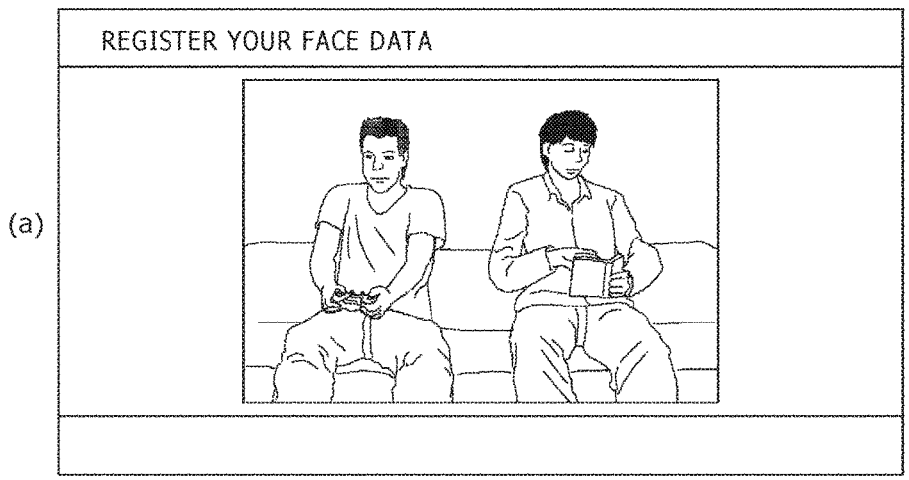
(a)
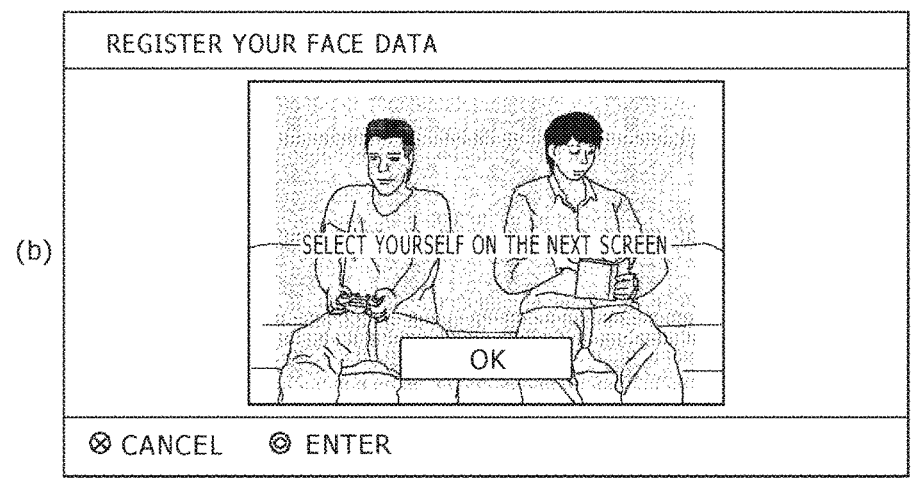
(b)

FIG.10
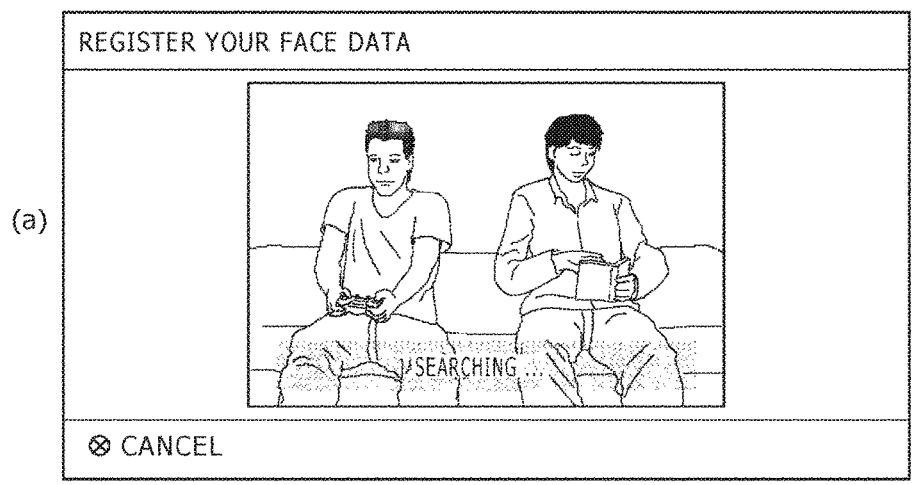
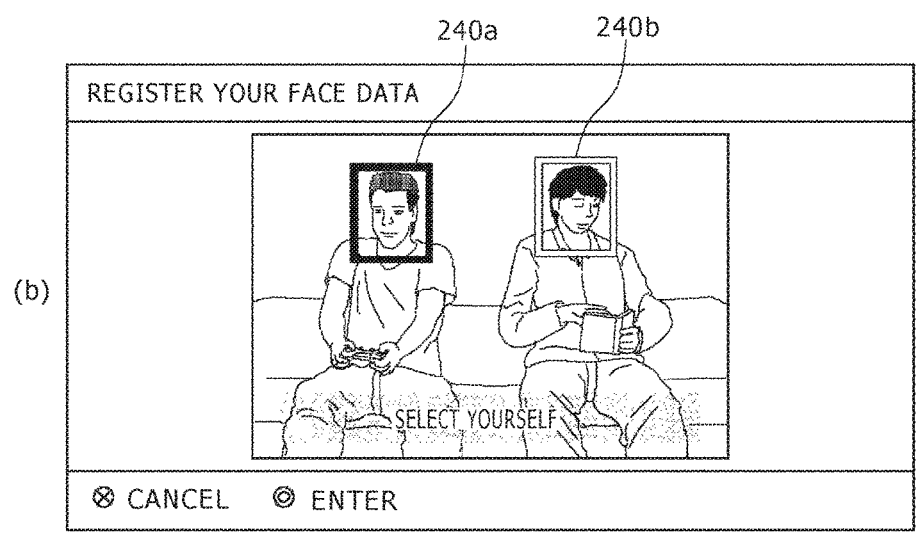

FIG.12
(a)
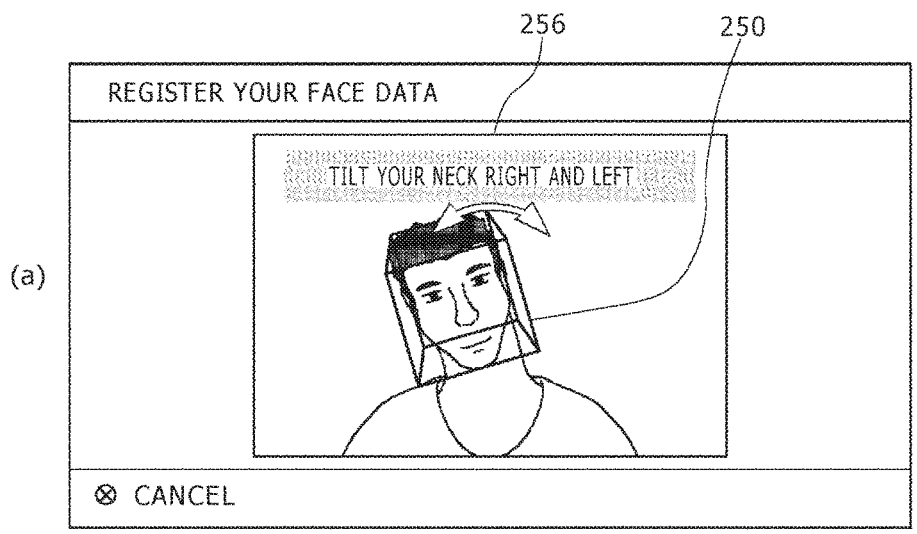
(b)
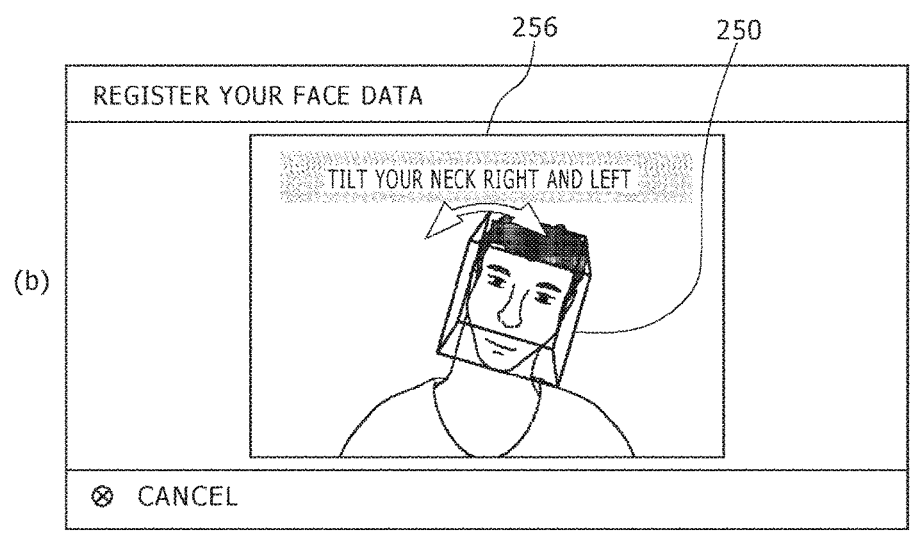

FIG.14

|  | USER A | USER B | USER C | USER D |
|---|---|---|---|---|
| FACE DATA | FACE IDENTIFYING DATA OF USER A | FACE IDENTIFYING DATA OF USER B | INITIAL DATA | INITIAL DATA |
| DAMAGE DETERMINATION | ABSENT | ABSENT | PRESENT | ABSENT |
| PRESENCE/ABSENCE OF FACE REGISTRATION | PRESENT | PRESENT | PRESENT | ABSENT |

DATA FOR USE IN FACE RECOGNITION IS DAMAGED
REGISTER YOUR FACE DATA AGAIN

OK

◎ ENTER

4

FIG.17
(a)
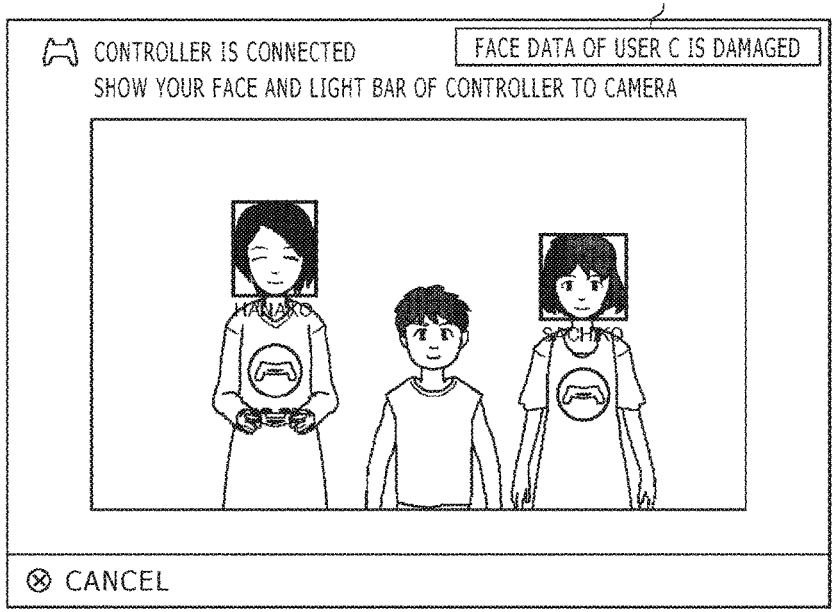
(b)
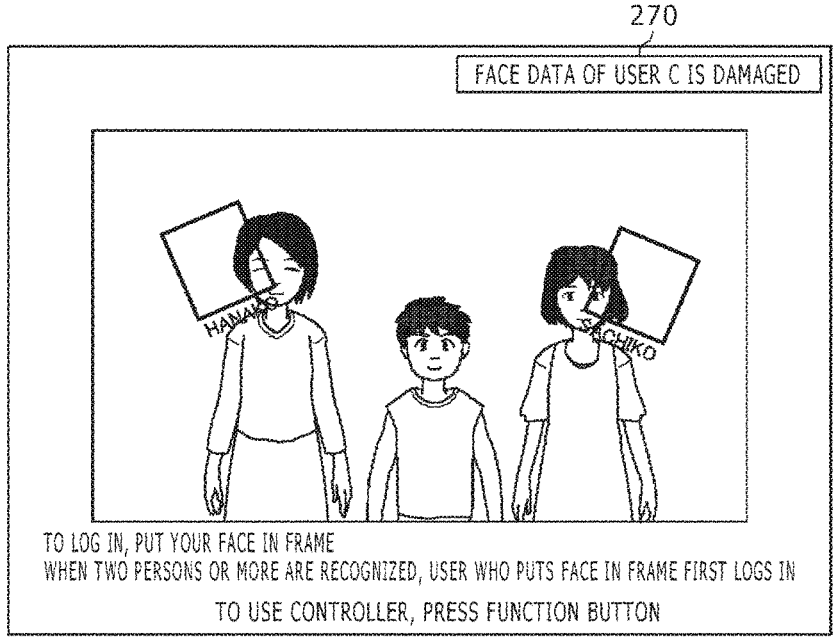

INFORMATION PROCESSING DEVICE

TECHNICAL FIELD

The present invention relates to an information processing device that allows a user to log in using face identifying data of the user.

BACKGROUND ART

When a user logs in to an information processing device such as a game device, the information processing device performs user authentication processing to identify whether or not the login user is a previously registered user. There are diverse types of user authentication, one of which is widely utilized password-based user authentication.

SUMMARY

Technical Problem

Apart from the password-based user authentication, user authentication may be performed using biological information of the user. The user authentication that uses biological information has no need for the user to input a password and thus saves the user's trouble in authentication. In particular, a face authentication system that recognizes the user's face from a digital image basically requires no specific action on the user's part. This system is thus known to represent a simplified type of user authentication. The face authentication system requires the user to register beforehand face identifying data for face authentication. If the registered face identifying data is damaged for some reason, the face authentication system fails to function properly.

It is therefore an object of the present invention to provide technology for enabling the face authentication system to return to its normal state if the face identifying data is found damaged.

Solution to Problem

In achieving the above object and according to one mode of the present invention, there is provided an information processing device including: an image obtaining section configured to obtain an imaged image from an imaging device; a registered user information retaining section configured to retain face identifying data of a registered user; a face authenticating section configured to detect a face image of the registered user present in the imaged image using the face identifying data retained in the registered user information retaining section; and a login processing section configured to allow the registered user to log in. The information processing device further includes: a damage determining section configured to determine whether or not the face identifying data retained in the registered user information retaining section is damaged; and a notifying section configured such that if the face identifying data is determined to be damaged, the notifying section notifies that the face identifying data is damaged.

It is to be noted that arbitrary combinations of the above constituent elements as well as modes obtained by converting expressions of the present invention between a method, a device, a system, a recording medium, and a computer program, among others, are also effective as modes of the present invention.

BRIEF DESCRIPTION OF DRAWINGS

FIG. 2(a) is a diagram depicting an external constitution of an upper surface of an input device, and FIG. 2(b) is a diagram depicting an external constitution of a side surface on a back side of the input device.

FIGS. 6(a) and 6(b) are diagrams depicting an example of a login screen in login processing 2.

FIGS. 7(a) and 7(b) are diagrams depicting an example of a login screen in login processing 3.

FIG. 9(a) is a diagram depicting a live screen displayed on an output device, and FIG. 9(b) is a diagram depicting a display example of a message.

FIG. 10(a) is a diagram depicting an execution screen for face search, and FIG. 10(b) is a diagram depicting a state in which a user's face image is put in a face frame.

FIGS. 12(a) and 12(b) are diagrams depicting examples of screens for guiding the user in performing face rolling actions.

FIG. 14 is a tabular view depicting an example of a face authentication list.

FIG. 15 is a diagram depicting an example of a notification screen notifying that a face file is damaged.

FIG. 17(a) is a diagram depicting a login screen for the login processing 2, and FIG. 17(b) is a diagram depicting a login screen for the login processing 3.

DESCRIPTION OF EMBODIMENTS

Figure 1:
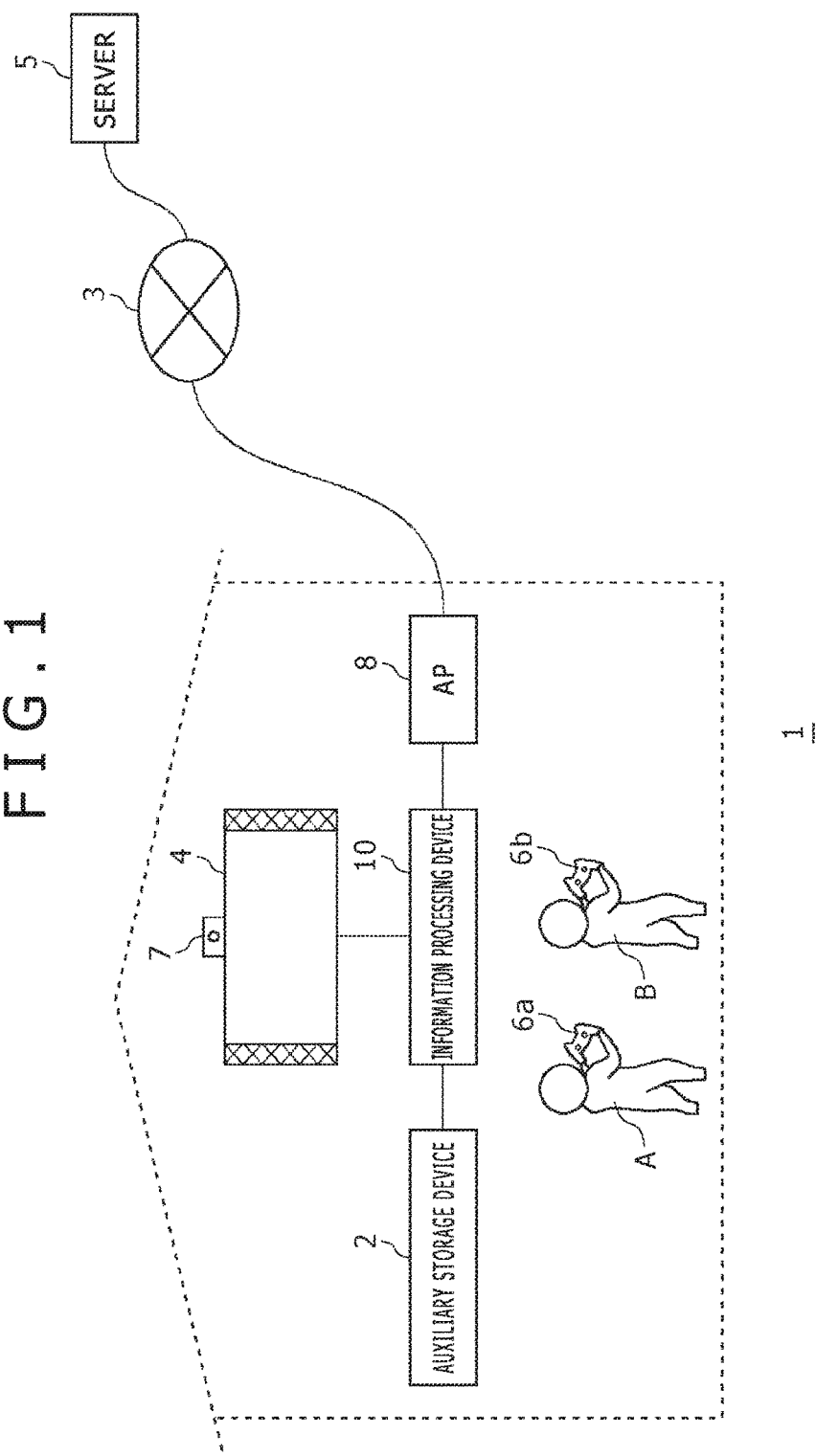
FIG. 1 is a diagram depicting an information processing system according to an embodiment of the present invention.

FIG. 1 depicts an information processing system 1 according to an embodiment of the present technology. The information processing system 1 includes an information processing device 10 as a user terminal and a server 5. An access point (hereinafter referred to as an "AP") 8 has functions of a wireless access point and a router. The information processing device 10 is connected to the AP 8 via radio or a wire to be communicatably connected to the server 5 on a network 3.

An auxiliary storage device 2 is a mass storage device such as a hard disk drive (HDD), a flash memory, or the like. The auxiliary storage device 2 may be an external storage device connected to the information processing device 10 by a universal serial bus (USB) or the like, or may be an internal storage device. An output device 4 may be a television set including a display for outputting an image and a speaker for outputting sound, or may be a computer display. The information processing device 10 is connected to an input device 6 operated by a user by radio or by wire. The input device 6 outputs an operation signal indicating a result of operation of the user to the information processing device 10. When the information processing device 10 receives the operation signal from the input device 6, the information processing device 10 reflects the operation signal in the processing of an operating system (OS) (system software) or an application, and makes a result of the processing output from the output device 4.

In the information processing system 1, the information processing device 10 may be a game device that executes a game, and the input device 6 may be a device such as a game controller or the like that provides the operation signal of the user to the information processing device 10. A camera 7 as an imaging device is provided in the vicinity of the output device 4. The camera 7 images a space around the output device 4. FIG. 1 depicts an example in which the camera 7 is attached to an upper portion of the output device 4. However, the camera 7 may be disposed on a side portion or a lower portion of the output device 4. In either case, the camera 7 is disposed in such a position as to be able to image the user located in front of the output device 4. The camera 7 may be a stereo camera.

The server 5 provides network service to the user of the information processing system 1. The server 5 manages a network account identifying each user. Each user signs in to the network service provided by the server 5 using the network account. By signing in from the information processing device 10 to the network service, the user can register, in the server 5, the save data of a game or a trophy, which is a virtual prize obtained during game play.

FIG. 1 depicts two users A and B operating input devices 6a and 6b as game controllers. The users A and B can each enjoy an application such as a game or the like by logging in to the OS of the information processing device 10.

A button configuration of the input device 6 will be described.

[Constitution of Upper Surface Portion]

FIG. 2(a) depicts an external constitution of an upper surface of the input device. The user operates the input device 6 while holding a left grip portion 78b with a left hand and holding a right grip portion 78a with a right hand. The upper surface of a casing of the input device 6 is provided with a direction key 71, analog sticks 77a and 77b, and four kinds of operating buttons 76 as input sections. The four kinds of buttons 72 to 75 are marked with different figures of different colors so as to be distinguished from one another. That is, the circle button 72 is marked with a red circle, the cross button 73 with a blue cross, the rectangle button 74 with a purple rectangle, and the triangle button 75 with a green triangle. A touch pad 79 is provided in a flat region between the direction key 71 and the operating buttons 76 on the upper surface of the casing. The touch pad 79 also functions as a depression type button that sinks downward when pressed by the user and which returns to an original position when released by the user.

A function button 80 is provided between the two analog sticks 77a and 77b. The function button 80 is used to turn on power to the input device 6 and simultaneously activate a communication function that connects the input device 6 and the information processing device 10 to each other. Incidentally, when the main power supply of the information processing device 10 is off, and the function button 80 is depressed, the information processing device 10 receives a connection request transmitted from the input device 6 also as an instruction to turn on the main power supply. The main power supply of the information processing device 10 is thereby turned on. After the input device 6 is connected to the information processing device 10, the function button 80 is also used to display a home screen on the information processing device 10.

A SHARE button 81 is provided between the touch pad 79 and the direction key 71. The SHARE button 81 is used to input an instruction from the user to the OS or the system software in the information processing device 10. In addition, an OPTIONS button 82 is provided between the touch pad 79 and the operating buttons 76. The OPTIONS button 82 is used to input instructions from the user to an application (i.e., game) executed by the information processing device 10. The SHARE button 81 and the OPTIONS button 82 may each be configured as a push type button.

[Constitution of Side Surface Portion on Back Side]

FIG. 2(b) depicts an external constitution of a side surface on the back side of the input device. On the upper side of the side surface on the back side of the casing of the input device 6, the touch pad 79 is extended from the upper surface of the casing. A horizontally long light emitting portion 85 is provided on the lower side of the side surface on the back side of the casing. The light emitting portion 85 has a red (R) light emitting diode (LED), a green (G) LED, and a blue (B) LED. The light emitting portion 85 illuminates according to light emission color information transmitted from the information processing device 10. When the two input devices 6a and 6b are used as depicted in FIG. 1, the information processing device 10 may set different colors, or blue and red, as respective lighting colors of the light emitting portions 85 of the input devices 6a and 6b so that the users A and B can distinguish the respective input devices 6. Each user can thereby recognize the input device 6 that the user is using by the lighting color of the light emitting portion 85. A possibility of the user mistaking the input device 6 is therefore reduced.

On the side surface of the back side of the casing, an upper side button 83a, a lower side button 84a, an upper side button 83b, and a lower side button 84b are disposed at positions bilaterally symmetric in a longitudinal direction. The upper side button 83a and the lower side button 84a are operated by the index finger and the middle finger, respectively, of the right hand of the user. The upper side button 83b and the lower side button 84b are operated by the index finger and the middle finger, respectively, of the left hand of the user. As depicted, the light emitting portion 85 is arranged between a right-hand array of the upper side button 83a and lower side button 84a and a left-hand array of the upper side button 83b and lower side button 84b. This arrangement prevents the camera 7 from being obstructed by the button-operating index fingers or middle fingers, allowing the camera 7 to suitably image the light emitting portion 85 being lit. The upper side buttons 83 may each be configured as a push type button, and the lower side buttons 84 may each be configured as a rotatably supported trigger type button.

There have recently appeared games that reflect the movement of the user in the movement of a game character. In a game using the gesture of the user, the user does not need to have the input device 6, and can move a character intuitively. In such a game, the user does not use the input device 6 in the first place, and therefore it is desirable to perform user authentication without the use of the input device 6 also when the user logs in to the OS of the information processing device 10. Incidentally, enabling the user to log in after a simple user authentication is meaningful in the information processing system 1 regardless of the kind of the game that the user plays after logging in.

The information processing system 1 according to the present embodiment accordingly provides a technology that enables user authentication to be performed simply by face recognition processing using an image imaged by the camera 7.

Figure 3:
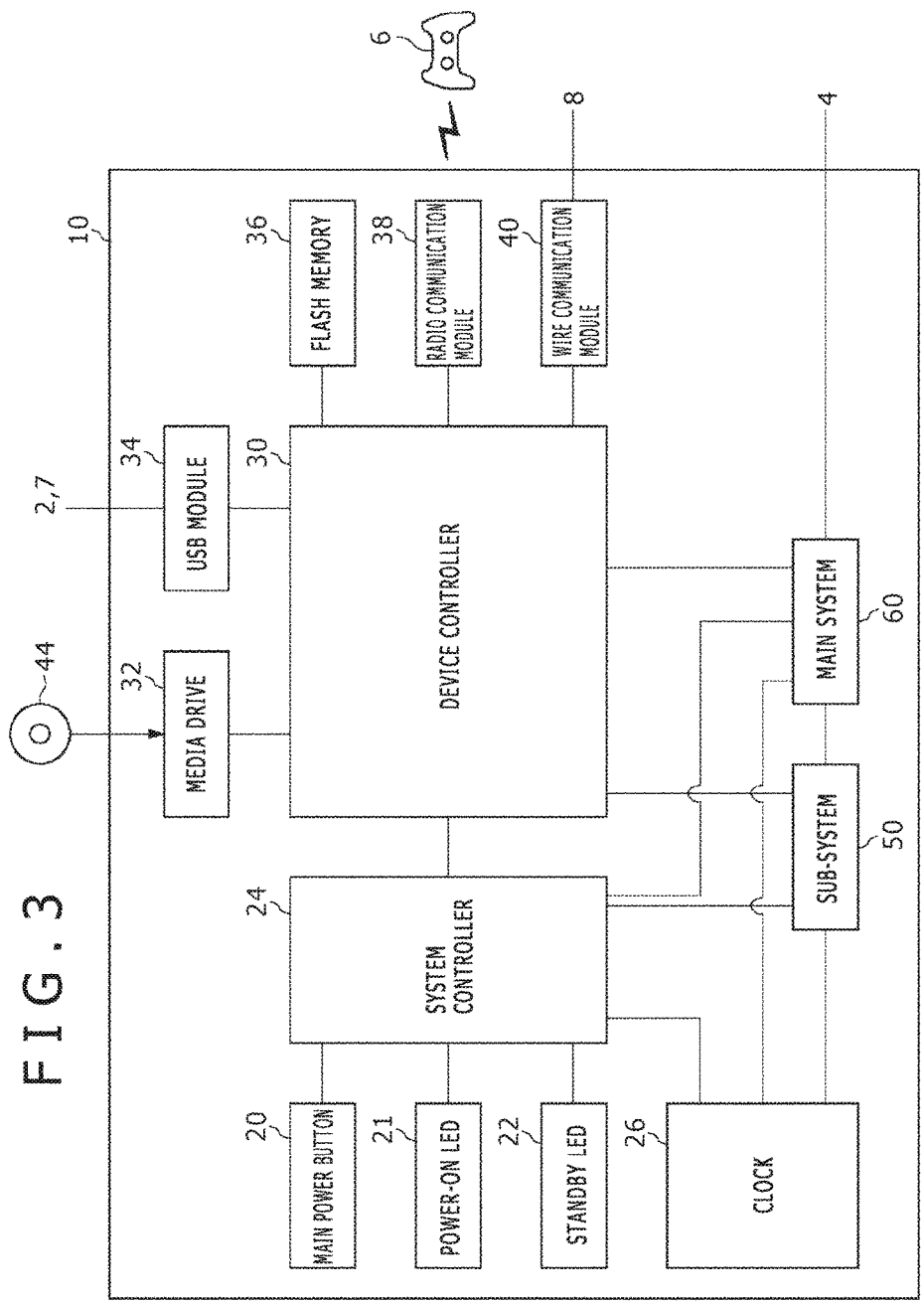
FIG. 3 is a functional block diagram of an information processing device.

FIG. 3 depicts a functional block diagram of the information processing device 10. The information processing device 10 includes a main power button 20, a power-on LED 21, a standby LED 22, a system controller 24, a clock 26, a device controller 30, a media drive 32, a USB module 34, a flash memory 36, a radio communication module 38, a wire communication module 40, a subsystem 50, and a main system 60.

The main system 60 includes a main central processing unit (CPU), a memory as a main storage device and a memory controller, a graphics processing unit (GPU), and the like. The GPU is used mainly for arithmetic processing of a game program. These functions may be configured as a system-on-chip, and formed on one chip. The main CPU has functions of starting the OS, and executing an application installed in the auxiliary storage device 2 under an environment provided by the OS.

The subsystem 50 includes a sub-CPU, a memory as a main storage device and a memory controller, but does not include a GPU. The number of circuit gates in the sub-CPU is smaller than the number of circuit gates in the main CPU, and the power consumption of the sub-CPU is lower than the power consumption of the main CPU. The sub-CPU keeps operating while the main CPU is in a standby state. The processing functions of the sub-CPU are limited so as to reduce its power consumption. The sub-CPU and the memory may be configured on a separate chip.

The main power button 20 is an input section to which an operating input from the user is performed. The main power button 20 is provided to a front surface of a casing of the information processing device 10. The main power button 20 is operated to turn on or off the supply of power to the main system 60 of the information processing device 10. An on state of the main power supply will hereinafter mean that the main system 60 is in an active state. An off state of the main power supply will hereinafter mean that the main system 60 is in a standby state. The power-on LED 21 is lit when the main power button 20 is turned on. The standby LED 22 is lit when the main power button 20 is turned off.

The system controller 24 detects the depression of the main power button 20 by the user. When the main power button 20 is depressed while the main power supply is in an off state, the system controller 24 obtains the depressing operation as a "turn-on instruction." When the main power button 20 is depressed while the main power supply is in an on state, on the other hand, the system controller 24 obtains the depressing operation as a "turn-off instruction."

The main CPU has the function of executing game programs installed in the auxiliary storage device 2 or ROM medium 44, while the sub-CPU does not have such a function. However, the sub-CPU has the function of gaining access to the auxiliary storage device 2 and the function of transmitting and receiving data to and from the server 5. Configured with such limited processing functions only, the sub-CPU operates with lower power consumption than the main CPU. These functions of the sub-CPU are executed while the main CPU is in a standby state. Because the subsystem 50 is operating during standby of the main system 60, the information processing device 10 according to the present embodiment maintains the state of signing in to the network service provided by the server 5 at all times.

The clock 26 is a real-time clock. The clock 26 generates present date and time information, and supplies the present date and time information to the system controller 24, the subsystem 50, and the main system 60.

The device controller 30 is configured as a large-scale integrated circuit (LSI) that transfers information between devices like a Southbridge. As depicted in the figure, the device controller 30 is connected with devices such as the system controller 24, the media drive 32, the USB module 34, the flash memory 36, the radio communication module 38, the wire communication module 40, the subsystem 50, the main system 60, and the like. The device controller 30 accommodates differences between electrical characteristics of the respective devices and differences between data transfer rates, and controls data transfer timing.

The media drive 32 is a drive device that is loaded with and drives a read only memory (ROM) medium 44 on which application software such as a game or the like and license information are recorded, and reads a program, data, and the like from the ROM medium 44. The ROM medium 44 is a read-only recording medium such as an optical disk, a magneto-optical disk, a Blu-ray disk, or the like.

The USB module 34 is a module connected to an external device by a USB cable. The USB module 34 may be connected to the auxiliary storage device 2 and the camera 7 by a USB cable. The flash memory 36 is an auxiliary storage device forming an internal storage. The radio communication module 38 performs wireless communication with the input device 6, for example, under a communication protocol such as a Bluetooth (registered trademark) protocol, an Institute of Electrical and Electronic Engineers 802.11 (IEEE 802.11) protocol, or the like. Incidentally, the radio communication module 38 may support a third-generation (3rd Generation) digital mobile telephone system compliant with an International Mobile Telecommunication 2000 (IMT-2000) standard defined by the International Telecommunication Union (ITU), or may further support a digital mobile telephone system of another generation. The wire communication module 40 performs wire communication with an external device. The wire communication module 40 is connected to the network 3 via the AP 8, for example.

The information processing device 10 according to the present embodiment has a plurality of kinds of login processing ready. When there is a login request from the user, the information processing device 10 determines the kind of login processing to be performed in accordance with the user's conditions, the operation conditions in which the login request is generated, and whether or not face identifying data is registered. The information processing device 10 then provides the user with a user interface of the determined login processing. Outlines of three kinds of login processing are described below.

<Login Processing 1>

In login processing 1, the information processing device 10 displays a user selecting screen on the output device 4. The user selects the icon of the user on the user selecting screen using the input device 6, and inputs a login passcode. In turn, the information processing device 10 performs user authentication and allows the user to log in. The login processing 1 is an ordinary login process that uses the user selecting screen.

<Login Processing 2>

In login processing 2, the information processing device 10 performs user face authentication using an image imaged by the camera 7. When the information processing device 10 determines that a detected face image represents the face of a registered user, the information processing device 10 specifies, to the registered user, a position to which to move the input device 6 within the camera image displayed on the display. When the user moves the input device 6 to the specified region, the information processing device 10 performs user authentication and allows the user to log in.

<Login Processing 3>

In login processing 3, the information processing device 10 performs user face authentication using an image imaged by the camera 7. When the information processing device 10 determines that a detected face image represents the face of a registered user, the information processing device 10 specifies, to the registered user, a position to which to move the face within the camera image depicted on the display. When the user moves the face to the specified region, the information processing device 10 performs user authentication and allows the user to log in.

The login processing 1 and the login processing 2 are similar to each other in that the login processing 1 and the login processing 2 both perform user authentication using the input device 6. However, the login processing 1 and the login processing 2 are different from each other in that the login processing 1 involves prompting the user to select himself/herself on the user selecting screen for user authentication while the login processing 2 involves performing user authentication when the user simply moves the input device 6 to the specified region. The login processing 1 is performed when the user operates the input device 6 to transmit a login request to the information processing device 10, with the user's face image not registered in the information processing device 10. The login processing 2 is carried out when the user operates the input device 6 to transmit the login request to the information processing device 10, with the user's face image registered in the information processing device 10. A comparison between the login processing 1 and the login processing 2 reveals that the login processing 2 is the simpler of the two processing kinds because the login processing 2 has no need for the user to select the user's icon on the user selecting screen.

The login processing 2 and the login processing 3 are similar to each other in that the login processing 2 and the login processing 3 both perform the user authentication using an image imaged by the camera 7. However, the login processing 2 and the login processing 3 are different from each other in that the login processing 2 performs the user authentication by detecting the input device 6 being moved to a predetermined region, whereas the login processing 3 carries out the user authentication by detecting the user's face being moved into to a predetermined region. The user generally operates the input device 6 when playing a game. Recently, however, there have appeared games that reflect the movement of the user in the movement of a game character. In a game using the gesture of the user, the user does not use the input device 6 in the first place. It is therefore desirable for the user authentication to be performed without the use of the input device 6 when the user logs in to the OS of the information processing device 10.

Accordingly, the login processing 3 is performed when the user depresses the main power button 20 with the information processing device 10 powered off for example, rather than when the user transmits a login request from the input device 6 to the information processing device 10. If, in the login processing 3, the user's face image is not detected from within the camera image, then transition is made to the login processing 1 that uses the input device 6. The user operates the input device 6 to select the user's icon from the selecting screen.

As described, the information processing device 10 determines which of the login processing 1, login processing 2, and login processing 3 is to be performed depending on whether or not the user has the face image registered and whether or not the user is transmitting a login request from the input device 6.

Figure 4:
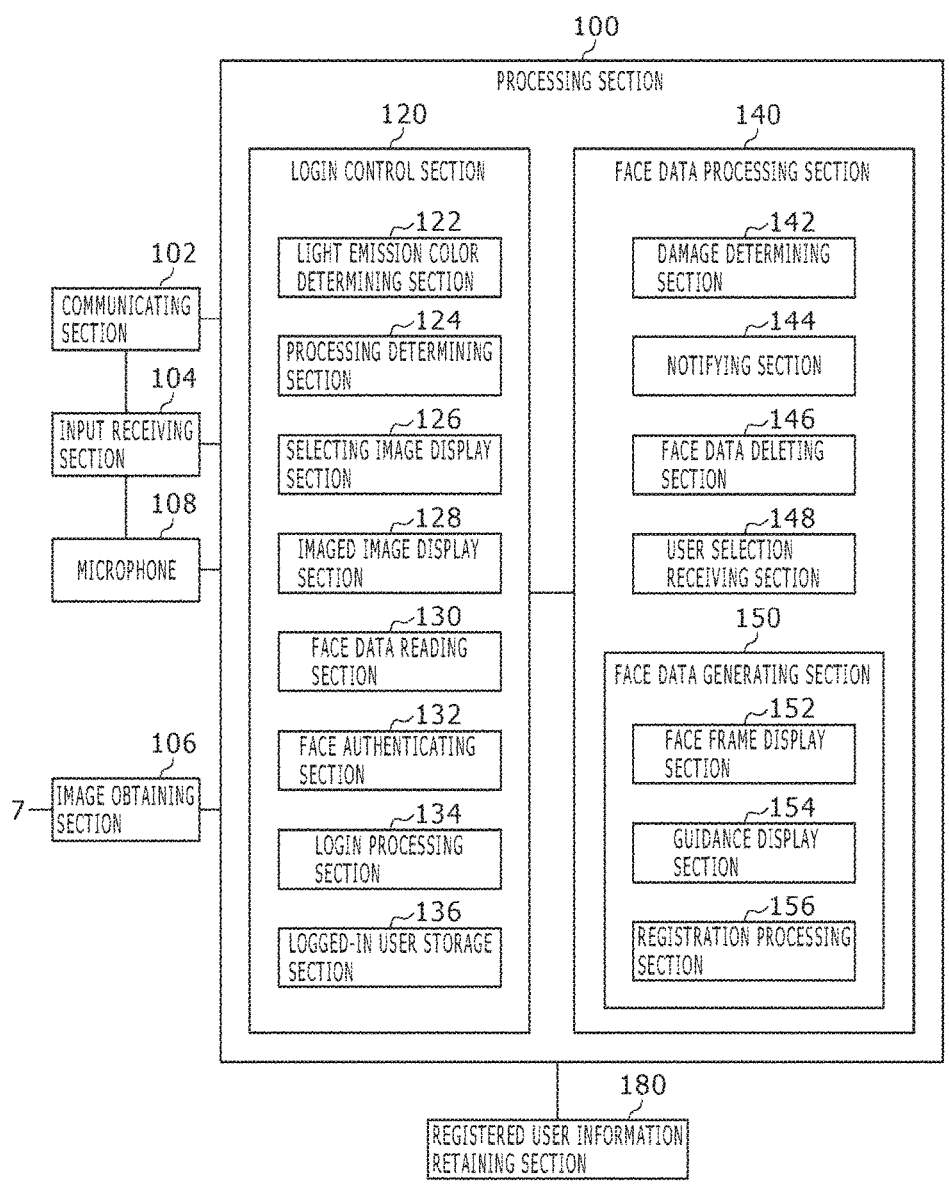
FIG. 4 is a diagram depicting a configuration of the information processing device.

FIG. 4 depicts a configuration of the information processing device 10. The information processing device 10 includes a communicating section 102, an input receiving section 104, an image obtaining section 106, a microphone 108, a processing section 100, and a registered user information retaining section 180. The functions of the processing section 100 are implemented by the OS of the information processing device 10 (system software), an application executed by the OS, and a memory. The processing section 100 includes a login control section 120 and a face data processing section 140. The login control section 120 includes a light emission color determining section 122, a processing determining section 124, a selecting image display section 126, an imaged image display section 128, a face data reading section 130, a face authenticating section 132, a login processing section 134, and a logged-in user storage section 136. The face data processing section 140 includes a damage determining section 142, a notifying section 144, a face data deleting section 146, a user selection receiving section 148, and a face data generating section 150. The face data generating section 150 includes a face frame display section 152, a guidance display section 154, and a registration processing section 156. The communicating section 102 represents the functions of the radio communication module 38 and the wire communication module 40 depicted in FIG. 3.

The elements described as functional blocks performing various processing in FIG. 4 can be configured by a circuit block, a memory, or another large-scale integration (LSI) in terms of hardware, and implemented typically by a program loaded into a memory in terms of software. Hence it is to be understood by those skilled in the art that these functional blocks can be implemented in various forms by hardware alone, by software alone, or by combinations of hardware and software, and are not limited to any one of these forms. Whereas the functions of the imaged image display section 128 and the face authenticating section 132 are shown included in the login control section 120, these functions are also used by the face data processing section 140.

One characteristic of the information processing device 10 according to the present embodiment is that it supports the user in making an easy login operation. As a precondition for logging in to the OS of the information processing device 10, the user needs to obtain a user account in advance and to register various user information in the information processing device 10. A user who has registered a user account in the information processing device 10 may be referred to as a "registered user" hereunder.

The registered user information retaining section 180 retains various information related to the registered user. Specifically, the registered user information retaining section 180 retains, as registered user information in association with the user account, a login passcode, sign-in identification (ID) for signing in to the server 5, a network account, the user's online ID (nickname on the network), and a user icon for representing the user, among others. For a registered user who has registered a face image in advance for face authentication processing, the registered user information retaining section 180 retains face identifying data as the registered user information in association with the user account.

In this case, the face identifying data is data on feature quantities of the face image of the registered user. However, the face identifying data may be face image data itself. The face identifying data is set as an object for comparison in face recognition processing by the face authenticating section 132, and is generated according to a face recognition algorithm adopted by the face authenticating section 132. For example, the face identifying data may be data obtained by extracting, as features, the relative positions and sizes of parts of the face and the shapes of the eyes, nose, cheekbones, and chin. In addition, the face identifying data may be data extracted as difference data from face image standard data. The kind of face identifying data to be extracted is determined by the adopted face recognition algorithm. In the present embodiment, the face authenticating section 132 adopts a known face recognition algorithm. As will be described later, the face identifying data is generated when the user agrees to have the face image registered and moves the face in front of the camera 7 in accordance with the guidance provided by the face data generating section 150. Obviously, for a user who does not have a face image registered, no face identifying data is generated. However, initial data not recognizable as a human face image may be registered in the registered user information retaining section 180 so that face authentication processing will be performed by the face authenticating section 132. The initial data need only be present at the time of face authentication processing by the face authenticating section 132. Since no face identifying data is registered in the registered user information retaining section 180 regarding a user not having a face image registered, the initial data may be allocated as the face identifying data to such a user with no face image registration at the time of face authentication processing.

Described below in detail is the processing for allowing the registered user to log in to the OS of the information processing device 10.

<Login Processing 1>

When the user depresses a predetermined button (e.g., function button 80) of the input device 6, information on the depression is transmitted to the information processing device 10. In the information processing device 10, the communicating section 102 receives the depression information as a connection request, and connects the input device 6 to the communicating section 102 accordingly. If the main power of the information processing device 10 remains off, the depression information from the function button 80 turns on the main power of the information processing device 10, before causing the communicating section 102 to connect with the input device 6. In addition, the depression information from the function button 80 is transmitted to the input receiving section 104. The input receiving section 104 receives the depression information as a login request from the user and forwards the request to the processing section 100.

First, the light emission color determining section 122 determines the light emission color of the light emitting portion 85 of the input device 6 that has transmitted the login request. The image obtaining section 106 obtains imaged image data from the camera 7. For example, the camera 7 images the target space periodically (e.g., at intervals of 1/30 seconds) and offers the imaged image to the image obtaining section 106 via the USB module 34. The light emission color determining section 122 determines the light emission color in accordance with a predetermined sequence of color assignments. If the light emission color determined by the assignment sequence is present in the imaged space, colors not found in the imaged space may be identified from the imaged image, and the light emission color may be determined from among the identified colors. After the light emission color determining section 122 determines the light emission color, the communicating section 102 transmits light emission color information to the input device 6. When the light emission color information specifies blue, the light emitting portion 85 of the input device 6 illuminates in blue.

The selecting image display section 126 reads registered user information retained in the registered user information retaining section 180, and generates a selecting image for selecting a user registered in the information processing device 10. Specifically, the selecting image display section 126 reads user icons and online IDs from the registered user information, and displays on the output device 4 a user selecting screen where the online IDs of registered users are arranged in a list format. This selecting screen constitutes a login screen in the login processing 1. As will be discussed later, at a time of initial display of the selecting screen, whether or not to perform the login processing 2 is determined. After it is determined that the login processing 2 is not to be performed, the user selecting screen formally constitutes the login screen in the login processing 1.

Figure 5:
FIG. 5(a) is a diagram depicting a user selecting screen.
FIG. 5(b) is a diagram depicting a passcode input screen.

FIG. 5(*a*) depicts an example of the user selecting screen. The selecting image display section 126 reads the user icons and online IDs of all registered users retained in the registered user information retaining section 180. The selecting image display section 126 displays the read user icons and the read online IDs in a list format in such a manner that the icon and ID can be selected by the user. The user icons and the online IDs will hereinafter be referred to as "user identifying information."

The imaged image display section 128 displays the imaged image obtained by the image obtaining section 106 in a small window region 202 as a part of the user selecting screen. This display image is a live image of the camera 7. A message "searching for registered faces" is displayed in the vicinity of the small window region 202. This message is displayed during face authentication processing performed by the face authenticating section 132. When the face authentication processing is ended, the message display disappears. That is, in the state depicted in FIG. 5(*a*), while the user selecting screen is being displayed, the face data reading section 130 operating in the background reads the face identifying data of all registered users from the registered user information retaining section 180. The face authenticating section 132 then checks whether there are users with their face images registered in the imaged image.

The face authenticating section 132 extracts a part assumed to be the face of a person from the imaged image, and derives feature quantity data of the part. The face authenticating section 132 next determines whether or not the extracted face is the face of a registered user by comparing the extracted face with the face identifying data read by the face data reading section 130.

Specifically, the face authenticating section 132 derives degrees of coincidence between the feature quantity data of the extracted user face image and the face identifying data of all registered users read from the registered user information retaining section 180 by the face data reading section 130. The degrees of coincidence are expressed by numerical values. For example, the degrees of coincidence are derived in the form of a score on a scale of 100. If the degree of coincidence with the feature quantity data of a registered face image exceeds a score of 90, the face authenticating section 132 determines that the imaged user is a registered user, and identifies which of the registered users is the imaged user. If there are a plurality of degrees of coincidence exceeding the score of 90, the face authenticating section 132 need only determine that the imaged user is the registered user identified by the user identifying data from which the highest score is derived. If none of the degrees of coincidence exceeds the score of 90 as a result of deriving the degrees of coincidence between the feature quantity data of the user face image extracted from the imaged image and the face identifying data of all registered users, the face authenticating section 132 determines that the user included in the imaged image is not a registered user. The face authenticating section 132 thus detects the face image of the registered user present in the imaged image using the face identifying data read from the registered user information retaining section 180 by the face data reading section 130. A known technology may be used as the face identifying technology.

As described above, a registered user can intentionally determine whether or not to register the user's face image in the information processing system 1. Some registered users thus do not have their face images registered. Since the face authenticating section 132 of the present embodiment is configured as a recognition engine that performs face recognition on all registered users, the users with no registered face images are assigned initial data as their face identifying data. The initial data is data that has a format permitting comparison with the feature quantity data of face images but always gives a score of a low degree of coincidence. Thus the degree of coincidence between the initial data of the users with no face image registration and the face feature quantity data extracted from the imaged image never exceeds the score of 90. As described above, for the users with their face images not registered, the initial data may be registered by default in the registered user information retaining section 180 as the face identifying data. Alternatively, at the time of face authentication processing, the initial data may be set as the face identifying data for the users with no face image registration.

When the face authenticating section 132 determines that none of the users included in the imaged image is a registered user, the login processing section 134 may put the displayed message "searching for registered faces" in a non-display state, and put the small window region 202 in a non-display state as well. When all users determined to be registered users by the face authenticating section 132 have already logged in, the login processing section 134 may also put the displayed message "searching for registered faces" in a non-display state and put the small window region 202 in a non-display state as well. In this manner, when a login request is generated by operation of the input device 6, the face authenticating section 132 determines whether non-logged-in users with their face images registered are included in the imaged image from the camera 7. If none of the users with their face images registered is determined to be included in the imaged image, the processing determining section 124 determines the login processing 1 as the login processing to be performed. The selecting image display section 126 then continues displaying the user selecting screen, and the login processing section 134 starts the login processing 1. The time it takes for the face authenticating section 132 to make the determination is a few seconds. The small window region 202 and the message are thus displayed only for a few seconds on the user selecting screen.

In the login processing 1, on the user selecting screen, the login processing section 134 displays a focus frame 200 surrounding one piece of user identifying information in such a manner that the frame can be moved across the list. The user moves the focus frame 200 to the display region of the user identifying information of the user by operating the input section of the input device 6, and presses a determination button (circle button 72) of the input device 6 to select the user identifying information of the user.

Suppose that the user requesting a login is user D and that the user D selects "SABURO" on the selecting screen by operating the input device 6. In that case, the login processing section 134 displays on the output device 4 a passcode input screen depicted in FIG. 5(b). When the user D inputs a registered passcode on the passcode input screen, the login processing section 134 determines whether the input passcode is the same as the login passcode of the user D whose login passcode is retained in the registered user information retaining section 180. The login processing section 134 then determines whether or not to allow the user D to log in. The login processing section 134 stores login information, i.e., information identifying user D (user account) and information identifying the input device 6 used by the user D (game controller ID) in association with each other in the logged-in user storage section 136. The login control section 120 performs the login processing 1 of the user as described above.

When the face authenticating section 132 operating as described above does not detect any non-logged-in registered user, the processing determining section 124 determines the login processing 1 as the login processing to be performed. The login processing section 134 then performs the login processing 1 to let the user D who has yet to register a face image log in smoothly.

As will be described later, the login processing 1 is also applied to registered users who have their face images registered but whose registered face identifying data has been damaged. For example, if the face identifying data of registered user C is damaged, the registered user C is unable to log in through face authentication. In such a case, the login processing 1 provides a scheme in which the registered user C is allowed to log in to the information processing device 10, with the information processing device 10 enabled to return quickly to a state permitting a login through face authentication. This scheme will be described later.

In the ensuing description, it is assumed that the face identifying data of users A and B is stored in the registered user information retaining section 180, that the online ID of the user A is "HANAKO," and that the online ID of the user B is "SACHIKO."

<Login Processing 2>

As described above, when the user generates a login request by operating the input device 6 and when the face authenticating section 132 determines that there is no user with a face image registered in the imaged image, the login processing 1 is performed. On the other hand, when the user generates a login request by operating the input device 6 and when the face authenticating section 132 determines that there is a non-logged-in user with a face image registered in the imaged image, the processing determining section 124 determines the login processing 2 as the login processing to be performed.

FIG. 6(a) depicts a login screen in the login processing 2. While the user selecting screen depicted in FIG. 5(a) is being displayed, the face authenticating section 132 may detect in the imaged image a user whose face image is registered. At this point, the user selecting screen is placed in a non-display state and the login screen depicted in FIG. 6(a) is displayed on the output device 4. The imaged image display section 128 provides live display of an image imaged by the camera 7 in an imaged image display region 206 on the login screen in the login processing 2.

The face authenticating section 132 sets a face region indicating the position of the face of the user A (online ID: HANAKO) in the imaged image and a face region indicating the position of the face of the user B (online ID: SACHIKO) in the imaged image. The login processing section 134 displays face frames 210 on the registered users on the basis of the position coordinates of the respective face regions and the information identifying the imaged registered users.

In this case, a face frame 210a is displayed on the user A and a face frame 210b is displayed on the user B. At this point, the login processing section 134 displays the online ID (HANAKO) of the user A in the vicinity of the face frame 210a, and displays the online ID (SACHIKO) of the user B in the vicinity of the face frame 210b. The display of their online IDs allows the users A and B to know that they are being recognized by face. If an online ID different from that of the user is displayed in the vicinity of the face frame 210 of that user, the user comes to know that face recognition of the user is not performed properly. The user in the middle is not a registered user with a face image registered, so that the face frame 210 is not displayed on that user. Where the user in the middle is a registered user with the face image registered but the face identifying data of that user is damaged for some reason, the face frame 210 is not displayed on that user as well.

For a registered user detected by the face authenticating section 132, the login processing section 134 displays a position specifying image 212 specifying the position of the input device 6 on the output device 4 serving as a display. In the login processing 2, the position specifying image 212 is displayed so as to let the input device 6 be moved and positioned when the registered user logs in.

FIG. 6(b) depicts a login screen in which the user has moved the input device 6 to the position specified by the position specifying image 212. Depicted in this case is a state in which the user A has lifted the input device 6 so that the input device 6 will be overlaid on a game controller image included in a position specifying image 212a displayed on the output device 4. The login processing section 134 monitors whether an image of the input device 6 is included in the region specified by the position specifying image 212a in the imaged image.

The login processing section 134 recognizes whether the input device 6 illuminated in blue is detected in the region specified by the position specifying image 212a displayed for use by the user A. Following successful recognition, the login processing section 134 allows the user A to log in to the information processing device 10. The login processing section 134 stores the login information, i.e., information specifying the user A (user account), information specifying the input device 6 used by the user A (game controller ID), and information specifying an input device 6a included in the imaged image (blue light emission information), in association with one another in the logged-in user storage section 136.

As described above, in the login processing 2, the face authenticating section 132 performs face authentication, followed by the login processing section 134 detecting whether the input device 6 is included in the specified region. Following successful detection, the login processing section 134 allows the registered user to log in. The login processing section 134 does not display the face frame 210 or the position specifying image 212 for any user who has already logged in. When the face authenticating section 132 detects that a registered user is included in the imaged image, the login processing section 134 references the logged-in user storage section 136 to determine whether the detected registered user has already logged in. For example, if the user B to the right on the screen (online ID: SACHIKO) is a logged-in user, the login processing section 134 does not display the face frame 210b or the position specifying image 212b.

<Login Processing 3>

The login processing 3 will be described next. In the login processing 3, the user logs in without using the input device 6.

When the user depresses the main power button 20 of the information processing device 10, the main power supply of the information processing device 10 is turned on, and the input receiving section 104 receives information on the depression of the main power button as a login request from the user.

When the input receiving section 104 receives the login request based on the depression of the main power button, the imaged image display section 128 displays an imaged image obtained by the image obtaining section 106 on the output device 4 serving as a display. Thus the output device 4 displays a live image imaged by the camera 7, with the user in front of the output device 4 being displayed thereon.

As described in relation to the login processing 1 and the login processing 2, the face authenticating section 132 detects the face image of a registered user present in the imaged image using the face identifying data read from the registered user information retaining section 180 by the face data reading section 130. As a result of this, the processing determining section 124 determines the login processing 3 as the login processing to be performed.

In the login processing 3, the face authentication processing is ranked as the face authentication in the first stage.

FIG. 7(a) depicts a login screen including face frames displayed on the output device 4. The imaged image display section 128 provides live display of the image imaged by the camera 7 in an imaged image display region 230 on the login screen in the login processing 3.

The face authenticating section 132 sets a face region indicating the position of the face of the user A (online ID: HANAKO) in the imaged image and a face region indicating the position of the face of the user B (online ID: SACHIKO) in the imaged image. The login processing section 134 displays, on the registered users, face frames 222 on the basis of the position coordinates of the respective face regions and the information identifying the imaged registered users.

In this case, the face frames 222a and 222b are displayed on the users A and B, respectively. At this point, a face frame processing section 138 displays the online ID of the user A in the vicinity of the face frame 222a and the online ID of the user B in the vicinity of the face frame 222b. The display of their online IDs allows the users A and B to know that their faces are properly recognized and that they need only move their faces into the face frames 222a and 222b at the time of login. The user in the middle is not a registered user with a face image registered, so that no face frame 222 is displayed on this user. Where the user in the middle is a registered user with the face image registered but the face identifying data of that user is damaged for some reason, the face frame 222 is also not displayed on that user.

FIG. 7(*b*) depicts a login screen in which a user has put the face in the face frame. Depicted in this case is a state in which the user A has moved the face and body so as to put the face into the face frame 222*a* displayed on the output device 4. The face authenticating section 132 monitors whether the face of a person is included in the face frame 222. When a face is found included the face region 222, the face authenticating section 132 determines whether the face included in the face image 222 is the face of a registered user, using the face identifying data read from the registered user information retaining section 180 by the face data reading section 130.

The face authenticating section 132 monitors whether the face of a person is included in the face frame 222 on the basis of the position coordinates of the face frame 222. The face recognition algorithm used here has already been discussed above. When the face authenticating section 132 estimates that face of a person is included in the face frame 222, the face authenticating section 132 derives the feature quantity data of that part, compares the feature quantity data with the face identifying data read by the face data reading section 130, and determines whether the face extracted through comparison is the face of a registered user. In the example of FIG. 7(*b*), the face authenticating section 132 determines that the face included in the face frame 222*a* is the face of the user A. In the login processing 3, the face authentication processing is ranked as the face authentication in the second stage. Completion of the face authentication in the first and the second stages brings to an end the user authentication at the time of login. The login processing section 134 then allows the user A to log in to the information processing device 10.

As described above, the login processing 2 and the login processing 3 are predicated on the registered user information retaining section 180 retaining the face identifying data. When a user generates a new user account, for example, the user may perform the work of registering face identifying data. The user may register new face identifying data at a different timing. Described below is the processing of registering the face identifying data in the registered user information retaining section 180.

In the present embodiment, the information processing device 10 is a stationary game device, with the camera 7 usually distanced from the user by approximately a few meters. In such circumstances, the face of a registered user trying to log in through face authentication may well be incorrectly positioned against the camera 7. Even in that case, it is preferred that the face authenticating section 132 determine whether the user included in the imaged image is a registered user. That is, even if the face of a registered user included in the imaged image is slightly tilted or if the orientation of the face is not aligned with the optical axis of the camera 7, it is preferable that the face authenticating section 132 perform the face authentication processing quickly in that state.

Accordingly, the face data generating section 150 generates the face identifying data regarding the user's face being rotated, and registers the generated face identifying data in the registered user information retaining section 180. This enables the face authenticating section 132 to properly perform the face authentication processing not only when the face of a registered user is positioned straight against the camera 7 but also when the face is tilted with regard to the camera 7 or the orientation of the face is not aligned with the optical axis of the camera 7. This in turn allows the user to log in quickly to the information processing device 10 in the login processing 2 and login processing 3 without having to position the user's face straight against the camera 7.

When the input receiving section 104 receives a face registration request from the input device 6 of the user, the guidance display section 154 displays a start screen for face registration on the output device 4. At this point, the registration processing section 156 specifies the user account of the user and retains it. Later, when the registration processing section 156 stores the face identifying data into the registered user information retaining section 180, the registration processing section 156 registers the face identifying data in association with the user account. If the user generates a new user account and if the camera 7 is connected with the information processing device 10 at this point, the guidance display section 154 may display a start screen for face registration on the output device 4.

Figure 8:
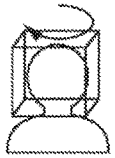
FIG. 8(a) is a diagram depicting an example of a start screen for face registration.
FIG. 8(b) is a diagram depicting an example of explanatory notes on the surroundings.

FIG. 8(*a*) is a diagram depicting an example of the start screen for face registration. When the user depresses the determination button of the input device 6 at the start screen, the input receiving section 104 receives the determining operation, and the guidance display section 154 displays explanatory notes on the surroundings on the output device 4. FIG. 8(*b*) is a diagram depicting an example of the explanatory notes on the surroundings. The user prepares the surroundings suitable for face registration by reading the explanatory notes.

At this point, the user depresses the determination button of the input device 6. In turn, the input receiving section 104 receives the determining operation, and the imaged image display section 128 displays on the output device 4 the imaged image obtained by the image obtaining section 106. This causes the output device 4 to display a live image imaged by the camera 7, with the user in front of the output device 4 being displayed thereon.

FIG. 9(*a*) is a diagram depicting a live screen displayed on the output device 4. The live screen includes two users. Each user may operate the input device 6 to carry out the work of registering the face identifying data. Upon elapse of a predetermined time (e.g., three seconds) after the imaged image display section 128 has displayed the live image, the guidance display section 154 superimposes on the live image a message prompting the user wanting face registration to select the face of the user. FIG. 9(*b*) is a diagram depicting a display example of the message. When the user depresses the determination button of the input device 6, the input receiving section 104 receives the determining operation, and the guidance display section 154 deletes the message from the screen.

FIG. 10(*a*) is a diagram depicting an execution screen for face search. The face authenticating section 132 performs face search processing in the image imaged by the camera 7, and identifies therein a part estimated as a human face (face region). In this case, two users are included in the imaged image, so that the face authenticating section 132 identifies two face regions. FIG. 10(*b*) depicts a state in which a user's face image is put in a face frame. Following the face search processing performed by the face authenticating section 132, the face frame display section 152 displays face frames 240*a* and 240*b* in a manner surrounding the face regions of the identified users. In FIG. 10(*b*), the face frame 240*a* is depicted as a black frame and the face frame 240*b* as a white frame. In this case, the black frame indicates a selected state and the white frame indicates an unselected state. When the user performs a rightward operation on the screen depicted in FIG. 10(*b*) by use of the input device 6, the black frame is shifted right and the face frame 200*b* is turned into a black frame. The user wanting face registration sets the user's face frame to the black frame and depresses the determination button of the input device 6. In turn, the input receiving section 104 receives the determining operation, and the guidance display section 154 displays on the output device 4 a guide for guiding the user in rotating the user's face relative to the camera 7.

Figure 11:
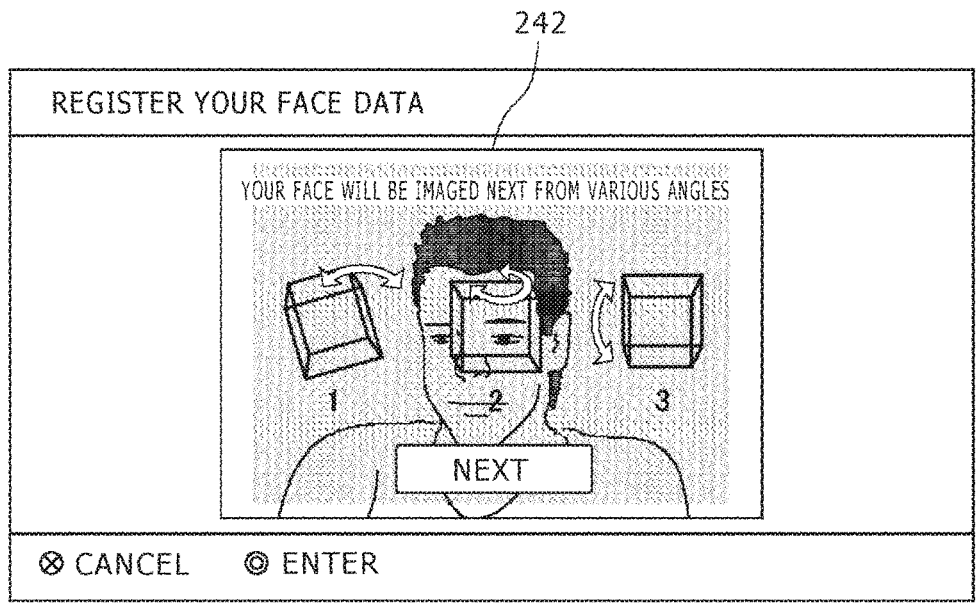
FIG. 11 is a diagram depicting an explanatory screen briefly explaining face rotating actions to be performed by the user.

FIG. 11 is a diagram depicting an explanatory screen briefly explaining face rotating actions to be performed by the user. When the face frame 240a depicted in FIG. 10(b) is selected by the user, the imaged image display section 128 displays, in an enlarged manner on the output device 4, the face region of the selected user included in the imaged image. The display allows the user to recognize that the face registration processing on the user is about to be started. The guidance display section 154 superimposes a guidance image 242 on the enlarged face image of the user.

With the present embodiment, the user performs three face rotating actions in front of the camera 7 as depicted in the guidance image 242. In each face rotating action, the user is to be positioned straight against the camera 7 in a reference posture. The user then moves the face (in practice, the neck) relative to the reference posture in accordance with the guidance provided by the guidance display section 154. This causes the registration processing section 156 to register the face identifying data of the user to the registered user information retaining section 180 in association with the user account on the basis of the face image of the user included in the imaged image.

The three face rotating actions are described below. In the ensuing description, the optical axis of the camera 7 will be referred to as the front-back direction. The crosswise direction and the vertical direction are also established in reference to the user's body.

The first action is a rolling action that involves rotation around the front-back direction. In the rolling action, the user turning the face to the camera 7 tilts the neck crosswise in at least one reciprocating motion within a predetermined angle range.

The second action is a yawing action. This is a rotating action around the vertical direction. In the yawing action, the user tilts the neck crosswise in at least one reciprocating motion within a predetermined angle range.

The third action is a pitching action. This is a rotating action around the crosswise direction. In the rolling action, the user rolls the neck vertically in at least one reciprocating motion within a predetermined angle range.

By viewing the guidance screen depicted in FIG. 11, the user recognizes that three face rotating actions are to be performed. On the guidance screen depicted in FIG. 11, the user depresses the determination button of the input device 6. This causes the input receiving section 104 to receive the determining operation.

FIGS. 12(a) and 12(b) are diagrams depicting examples of screens for guiding the user in performing the rolling action. FIGS. 12(a) and 12(b) indicate guidance screens regarding the rolling action. The guidance display section 154 displays on the output device 4 a guidance image 256 in which a box body 250 indicated in 3-D rolls in reciprocating motion around the front-back direction. The guidance image 256 gives a video of the box body 250 rolling right and left. The user tilts the neck crosswise in keeping with the rolling box body 250.

The registration processing section 156 generates the face identifying data on the basis of the face image of the user included in the imaged image. In this case, while the box body 250 depicted in FIGS. 12(a) and 12(b) is being displayed, the user tilts the neck right and left. The registration processing section 156 then generates the face identifying data on the basis of not only the position of the user facing the camera 7 straight on but also the face images of the user's positions tilted aslant at predetermined angles. For example, the tilting angles may be plus 15 degrees and minus 15 degrees relative to the reference position. After generating the face identifying data of the face images tilted at the predetermined angles, the registration processing section 156 notifies the guidance display section 154 that the processing of face identifying data generation is completed. The guidance display section 154 moves the box body 250 continuously within the imaged image until the completion notification is received.

The face data generating section 150 performs the above processing for the other rotating directions i.e., for the yawing and the pitching of the user's face. While the user moves the face in three different rotating directions, the registration processing section 156 generates the face identifying data obtained from diverse angles. The registration processing section 156 generates the face identifying data based on the three rotating actions of the user's face, and registers the generated face identifying data to the registered user information retaining section 180 in a predetermined format. The face identifying data is arranged into a face file for each user. The face files are configured to have a predetermined file size each.

With the face identifying data registered in the registered user information retaining section 180 as described above, the user can log in to the information processing device 10 through face authentication by the login processing 2 and login processing 3. However, it might happen that at the time the registration processing section 156 registers the face identifying data to the registered user information retaining section 180, the power cable of the information processing device 10 may be unplugged from the outlet. In such a case, the face identifying data may be registered in a damaged state in the registered user information retaining section 180. It might also happen that the normally registered face identifying data could later be damaged for some reason. There may be cases where the user, having knowingly registered the face data, later finds the face identifying data to be damaged unintentionally. In such cases, the login processing 2 and the login processing 3 cannot be performed on the user.

Described below is the scheme in which the information processing device 10 prompts the user whose face data has been damaged to again perform the face registration processing.

(Face Image Reregistration Processing 1)

In face image reregistration processing 1, the login control section 120 prompts a registered user whose face data is damaged to log in through the login processing 1 not involving face authentication. Thereafter, the face data processing section 140 prompts the user to again perform the face registration processing.

Figure 13:
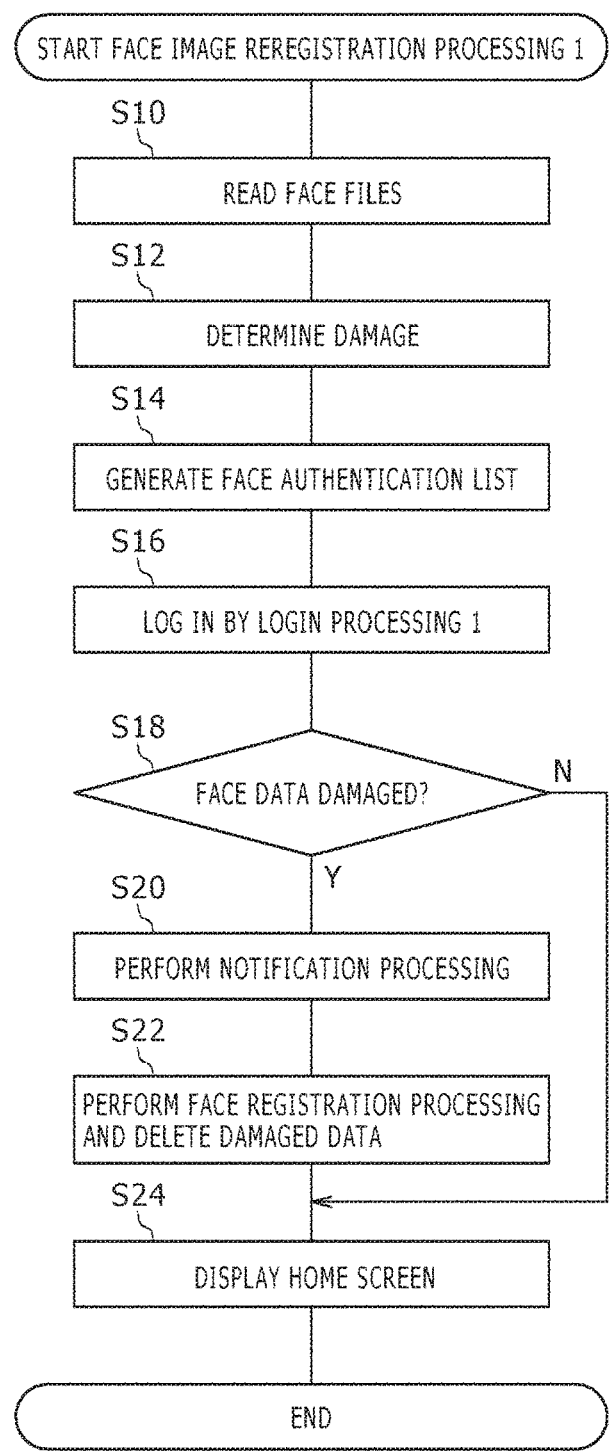
FIG. 13 is a flowchart of face image reregistration processing.

FIG. 13 is a flowchart of face image reregistration processing 1.

As described above, when a non-logged-in user depresses the function button 80 of the input device 6, or when a non-logged-in user depresses the main power button 20 with the information processing device 10 switched off, the face data reading section 130 reads the face identifying data of all registered users from the registered user information retaining section 180 (S10). In the ensuing description, it is assumed that the user C is about to log in to the information processing device 10 and that the face identifying data of the user C is damaged.

The damage determining section 142 determines whether or not the face identifying data of each user read by the face data reading section 130 is damaged (S12). For example, if the damage determining section 142 finds that the file size of a retrieved face identifying data file is not appropriate, the damage determining section 142 determines that the face identifying data of that user is damaged. An inappropriate file size means that the size of the retrieved face file is out of a presumed range, such as when the file size is 0, when the file size is larger than a predetermined first reference value, or when the file size is smaller than a predetermined second reference value. A face file containing the normal face identifying data is configured to have a predetermined file size in a predetermined format. Thus the damage determining section 142 can determine whether or not the face identifying data is damaged by referencing the file size of each retrieved face file. In this manner, the damage determining section 142 can detect not only the state in which the face identifying data is totally damaged but also a state where the reliability of the face identifying data is presumably reduced. The damage determining section 142 may also determine the face identifying data to be damaged if the face data reading section 130 is unable to open or read the face identifying data file of a user.

For the damage determining section 142 to perform damage determination, the registration processing section 156 may add a code such as checksum to a face file of the face identifying data when generating that face file. This allows the damage determining section 142 to easily determine whether or not the face identifying data is damaged by referencing the checksum of the face file read by the face data reading section 130. Alternatively, when generating the face identifying data, the registration processing section 156 may add a timestamp to the data to indicate the date and time at which the data is generated. This allows the damage determining section 142 to compare the date and time of data generation indicated by the timestamp with the current date and time. If the comparison reveals that the date and time of the data generation precede the current date and time, the damage determining section 142 determines that the face identifying data is damaged.

As another alternative, where the registration processing section 156 generates a file name of the face identifying data according to predetermined rules, the damage determining section 142 may determine whether the file name complies with the rules. If it is determined that the file name fails to comply with the predetermined rules, the damage determining section 142 may determine that the face identifying data is damaged. Where the face identifying data includes records of face image feature quantities, the damage determining section 142 may perform damage determination by checking whether the feature quantities are appropriate. For example, if the distance between the eyes is longer than the width of the face, the damage determining section 142 may determine that the face identifying data is damaged.

As described above, when the face data reading section 130 reads the face identifying data, the damage determining section 142 determines whether or not the face identifying data of each user is damaged. Where the reliability of the face identifying data is determined to be reduced for some reason as discussed above, the damage determining section 142 also determines that the data is damaged.

After reading the face identifying data, the face data reading section 130 generates a face authentication list for use by the face authenticating section 132 for face authentication (S14). At this point, a result of the determination by the damage determining section 142 is also inserted in the list.

In the information processing device 10 of the present embodiment, the information of four users A, B, C, and D is registered as that of the registered users in the registered user information retaining section 180. It is assumed here that the users A, B, and C have their face images registered and that the face identifying data of the user C is damaged. It is also assumed that the user D has yet to register a face image, so that the initial data is used as the face identifying data of the user D. As described above, the initial data is data with a score of an appreciably low degree of coincidence with face images in the face recognition processing.

FIG. 14 is a tabular view depicting an example of a face authentication list. A face authentication list 260 includes the authentication data of all users A through D and is prepared in accordance with the state in which the face files are read by the face data reading section 130. In the list, the term "face data" refers to the data used as the target for comparison in the face recognition processing performed by the face authenticating section 132, and the term "damage determination" denotes the result of damage determination performed by the damage determining section 142. The term "presence/absence of face registration" indicates whether or not a given user has performed the face registration processing. In this example, the users A, B, and C have their face images registered. Thus each of the fields of the item "presence/absence of face registration" includes information indicating that the users A, B, and C have their face images registered and that the user D has no face image registered. Alternatively, the presence or absence of face registration may be represented by a flag value.

As described above, if the damage determining section 142 determines that the face identifying data of the user C is damaged, the information indicative of the presence of damage is input to the "damage determination" field of the user C. If the damage determining section 142 determines that the face identifying data of the users A, B, and D is normal, the information indicative of the absence of damage is input to the "damage determination" fields of the users A, B, and D. The presence or absence of damage may be represented by a flag value. At this point, the face data reading section 130 inputs initial data or information for link to the initial data to the "face data" item of the user C. In the present embodiment, the face authenticating section 132 works to compare the face identifying data of all registered users with the image data of imaged faces. However, if the face identifying data of the user C is damaged, the face data reading section 130 may register comparable initial data to the face authentication list 260 as the face identifying data of the user C.

Alternatively, the damage determining section 142 may input damage type information to the "damage determination field" of the user C together with the information indicative of the presence of damage. The types of damage include inappropriate file size and unopenable file, for example. If the information specifying such a damage type is also input, it is possible to notify the user of the face identifying data being damaged along with the information about the type of the damage.

If the user C wants to log in at this point, the imaged image obtained by the image obtaining section 106 includes the face image of the user C but the face authentication list 260 does not include the face identifying data of the user C, so that the face authenticating section 132 does not detect the face image of the user C. Thus the user C selects, on the user selecting screen depicted in FIG. 5(a), the user identifying data of the user C to log in (S16). That is, the login processing section 134 allows the user C to log in by the login processing 1 in this case. The notifying section 144 references the face authentication list 260 to see whether the face identifying data of the logged-in user C is damaged. When recognizing that the face identifying data of the logged-in user C is damaged (Y in S18), the notifying section 144 notifies the logged-in user C that the face identifying data is damaged (S20). If the face identifying data of the logged-in user C is not damaged (N in S18), the processing section 100 outputs the home screen of the information processing device 10 on the output device 4 (S24).

FIG. 15 is a diagram depicting an example of a notification screen notifying that a face file is damaged. When the damage determining section 142 has determined that the face identifying data of the logged-in user C is damaged, the notifying section 144 notifies the user C of the damaged face identifying data. At this point, the notifying section 144 may additionally notify the user C of information specifying the damage type. When notified of the damaged face file, the user C comes to know why face authentication login has failed. The user C also recognizes that in order to log in through face authentication, the user needs to reregister the face data. When the user C operates the determination button of the input device 6 on the notification screen depicted in FIG. 15, the face data generating section 150 starts the face image reregistration processing 1.

Having started the reregistration processing 1, the face data generating section 150 performs the face registration processing described above with reference to FIGS. 8 through 12. The user C tilts the neck in the three rotating directions to register the face identifying data to the registered user information retaining section 180 along with information indicating that the face registration is made (S22). At the time the registration processing section 156 registers the face file of the face identifying data of the user C to the registered user information retaining section 180, the face data deleting section 146 deletes the damaged face identifying data of the user C from the registered user information retaining section 180. Alternatively, the damaged face identifying data may be overwritten with the new face identifying data and thereby deleted. This allows the user C, at the next login, to log in through face authentication. At the completion of the face registration processing, the processing section 100 displays the home screen of the information processing device 10 on the output device 4 (S24).

If the user operates the cancel button on the start screen for face registration in FIG. 8(a), the face data reregistration processing 1 is not performed. The processing section 100 then displays the home screen on the output device 4, with the user C allowed to log in (S24). At this point, the face data deleting section 146 does not delete the damaged face file from the registered user information retaining section 180. If the user operates the cancel button halfway through the face registration processing to abort the face data reregistration processing 1, the face data deleting section 146 also does not delete the damaged face file from the registered user information retaining section 180. With the reregistration processing 1 not carried out, the damaged face file of the user C is left undeleted in the registered user information retaining section 180.

After the user C agrees to reregister the face data on the notification screen depicted in FIG. 15, the face data deleting section 146 may delete the face identifying data of the user C. However, if the user C cancels the face data reregistration processing 1 halfway and does not reregister the face image, with the damaged face identifying data left undeleted in the registered user information retaining section 180, the notifying section 144 has the advantage of again presenting the user C with the notification screen depicted in FIG. 15. Thus when the reregistration processing 1 is completed and the face identifying data is reregistered, the face data deleting section 146 deletes the damaged face file. The timing of deleting the damaged face file is the same as in reregistration processing 2, to be described below.

(Face Image Reregistration Processing 2)

In face image reregistration processing 2, before the login processing section 134 allows a registered user to log in, the notifying section 144 notifies that the face identifying data is damaged along with information identifying the user who has the damaged face identifying data. The user C applicable here views on the login screen the notification that the user's face identifying data is damaged and comes to recognize the need for face image reregistration processing.

Figure 16:
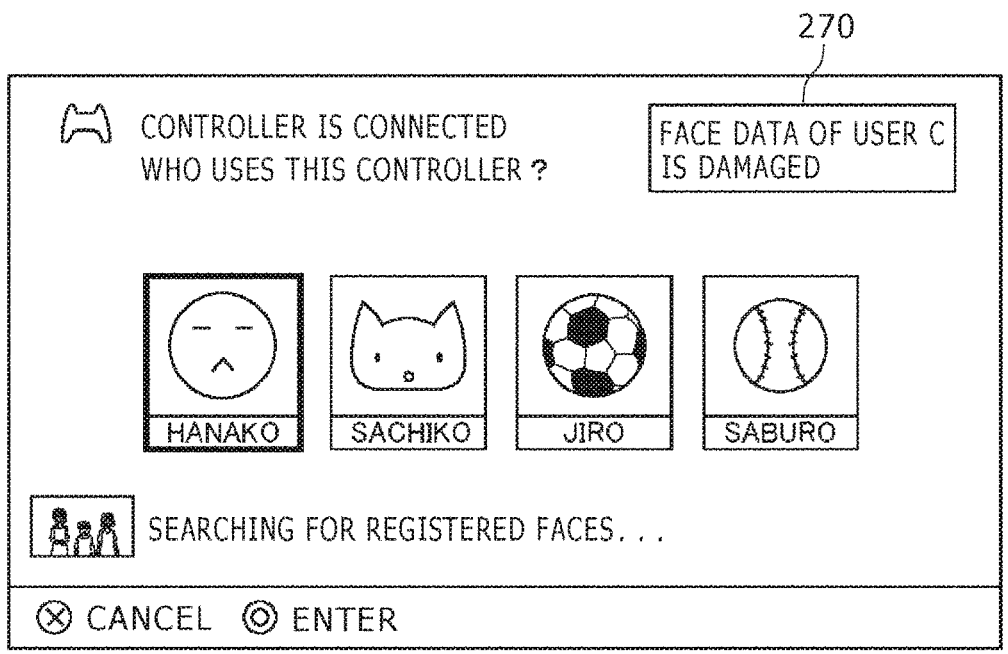
FIG. 16 is a diagram depicting a login screen for login processing 1.

FIG. 16 is a diagram depicting a login screen for login processing 1. After the damage determining section 142 determines that the face identifying data of the user C is damaged, the notifying section 144 displays on the login screen a damage notifying message 270 indicating that the face identifying data of the user C is damaged.

In the face image reregistration processing 2, while a user's login is being processed, i.e., while the login screen is being displayed, the notifying section 144 gives notification of the damage notifying message 270 regardless of which user is about to log in. If the user about to log in is the user C, the user C selects the damage notifying message 270 by operating the input device 6. In turn, the user selection receiving section 148 receives the selecting operation. This enables the face data generating section 150 to perform the face registration processing described above with reference to FIGS. 8 through 12, allowing the user C to reregister the face image. As described, it is preferred that the damage notifying message 270 be displayed as a graphical user interface (GUI) for starting the face data generating section 150 and that the selection of the damage notifying message 270 by the user C make smooth transition to the face image registration processing. If the user about to log in is not the user C, that user can simply ignore the damage notifying message 270.

If the user selection receiving section 148 does not receive the operation to select the damage notifying message 270 at the time the notifying section 144 gives notification of the first damage notifying message 270, the notifying section 144 may give notification of the next damage notifying message 270 upon elapse of a predetermined time period (e.g., one week later). If the operation to select the damage notifying message 270 is not performed, a user other than the user C has presumably logged in. It may not be desirable to frequently present the damage notifying message 270 to users other than the user C. The notifying section 144 may thus give notification of the damage notifying message 270 on the login screen not whenever it is displayed but when it is displayed upon elapse of a predetermined time period.

FIG. 17(a) is a diagram depicting a login screen for the login processing 2, and FIG. 17(b) is a diagram depicting a login screen for the login processing 3. On these login screens, the notifying section 144 also gives notification of the damage notifying message 270. In order for the login screens to be generated for the login processing 2 and login processing 3, the image imaged by the camera 7 is required to include a user whose face image is registered. In the example of FIGS. 17(a) and 17(b), the face identifying data of the users A and B is registered in the registered user information retaining section 180. Thus the login screens are displayed here when the face authenticating section 132 detects the users A and B. If the user in the middle is the user C, the user C viewing the camera image recognizes that the face frame of the user C is not set and that the online ID of the user C (JIRO) is not displayed. By selecting the damage notifying message 270, the user can make smooth transition to the face image registration processing.

As described above, in the face image reregistration processing 2, the user C is notified of the face identifying data being damaged during the login processing, i.e., during display of the login screen. The user C thus recognizes that it is preferable to reregister the face data before logging in. When the face data generating section 150 has registered the face file of the face identifying data of the user C to the registered user information retaining section 180, the login processing section 134 allows the user C to log in.

In the reregistration processing 2, after the user C has logged in by the login processing 1 from the selecting screen depicted in FIG. 16(a), the reregistration processing 1 may be started. This means that after the user C has logged in, the notifying section 144 may display the notification screen depicted in FIG. 15 to give the user C the chance to again register the face image.

Described above were the reregistration processing 1 performed after the user C has logged in and the reregistration processing 2 carried out while the login of the user C is being processed. The notifying section 144 may give notification of the damage notifying message 270 before the login screen is displayed or while the home screen is being displayed.

The present invention has been described above using a specific embodiment. In connection with this embodiment, there was described a scheme in which a registered user is prompted to reregister the face image if the face identifying data of that user is damaged. It is to be understood by those skilled in the art that suitable combinations of constituent elements and processes of the above-described embodiment may lead to further variations of this invention and that such variations also fall within the scope of this embodiment. For example, where a user has registered a passcode, the user may be prompted to input the passcode at the time of face authentication login in the login processing 2 or the login processing 3.

In the above embodiment, when the face identifying data is again registered at the completion of the reregistration processing, the face data deleting section 146 deletes the damaged face file. Alternatively, the face data deleting section 146 may delete the damaged face file before the execution or completion of the reregistration processing. In this case, the notifying section 144 may be controlled to present the user C with the notification screen depicted in FIG. 15.

For the face authentication login, it is preferable to minimize the possibility of erroneously recognizing face images. The face authenticating section 132 derives a score of the degree of coincidence between the feature quantity data of the face image included the imaged image and the face identifying data read from the registered user information retaining section 180. If the degree of coincidence exceeds the score of 90, the face authenticating section 132 determines that the imaged user is a registered user. If there are a plurality of users having scores of higher than 90 each, the face authenticating section 132 determines whether each imaged user is a registered user whose face identifying data is given the highest score.

Suppose that a man has the face identifying data registered and his younger brother does not have the face identifying data registered. In that case, the face authenticating section 132 may evaluate the younger brother's face image to have a high degree of coincidence with the face identifying data of the elder brother, authenticating the younger brighter erroneously as his older sibling. If the face identifying data of the younger brother was previously registered, his face image will give a higher score of the degree of coincidence with his previously registered face identifying data. This enables the face authenticating section 132 to determine correctly that the imaged face is that of the younger brother. In order to minimize the possibility of erroneous recognition by the face authenticating section 132, it is important that all registered users have their face images registered beforehand and that the face authenticating section 132 derive a score of the degree of coincidence between the face identifying image of each user and the imaged face.

Under the circumstances, a user who has yet to register a face image may be prompted by the face data processing section 140 to perform face data registration processing if the conditions described below are met. Where the camera 7 is connected to the information processing device 10, a user who has generated a new user account is automatically offered a start screen for face registration (see FIG. 8(a)). When the user operates the cancel button during display of this face registration start screen or halfway through face registration, the face data of the user is not registered. In that case, the user is prompted to perform the face data registration processing if the conditions below are met.

(Condition 1)

Condition 1 is that the user has yet to register the face image although the user was offered the face registration start screen in the past (i.e., the user has yet to register the face data).

(Condition 2)

Condition 2 is that the user has canceled the face authentication login (login processing 2 and login processing 3 following erroneous recognition).

The condition 1 is intended for use in determining whether or not the face registration processing was canceled in the past. Information indicating whether or not the face registration processing was canceled earlier may be registered in the registered user information retaining section 180 for each user.

The condition 2 signifies that because the login processing section 134 has erroneously recognized a user who has yet to register a face image (e.g., user D) as another user who has registered the face image, the login processing 2 or the login processing 3 is started as the login processing through face authentication, which is canceled by the user D.

The notifying section 144 generates a notification screen prompting the registration of a face image for a user who has yet to register a face image and who meets the conditions 1 and 2 above.

Figure 18:
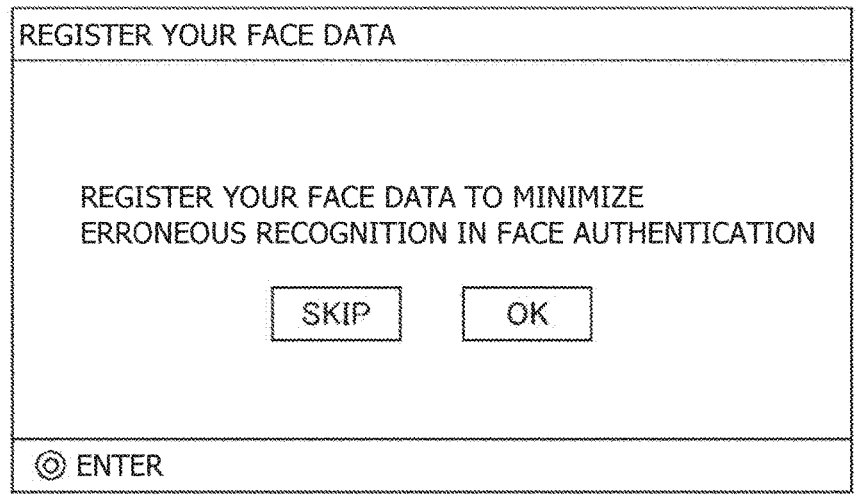
FIG. 18 is a diagram depicting an example of a notification screen prompting registration of a face image.

FIG. 18 is a diagram depicting an example of the notification screen prompting the registration of a face image. If there is a user who has yet to register a face image and who meets the conditions 1 and 2 above, the notifying section 144 notifies the user of a message prompting the registration of the face image. In the above embodiment, the user D has yet to register the face image. If the user D is found to meet the conditions 1 and 2 above, the notifying section 144 presents the user D with the notification screen after the user D has logged in.

When the user D operates the OK button on the notification screen, the face data generating section 150 performs the face registration processing described above with reference to FIGS. 8 through 12. On the other hand, if the user D selects the SKIP button on the notification screen, the face registration processing is not carried out. Information indicating that the user D has skipped the face registration processing on the notification screen is registered in the registered user information retaining section 180. Operation of the SKIP button on the notification screen signifies that although the user D has been erroneous recognized as another user, the user D still does not wish to register the face data. Thus even if the user D subsequently meets the conditions 1 and 2 above, the notifying section 144 does not present the user D with the notification screen, by referencing the information indicating that the user D skipped the face registration processing on the notification screen.

The preceding example was one in which a user who has yet to register a face image is prompted to register the face image. Meanwhile, there are cases where a user who has registered the face image is still recognized erroneously. In order to improve the accuracy of face recognition, the face data processing section 140 may prompt the user who has registered the face data to also perform processing of registering additional face data if the condition described below is met.

(Condition 3)

Condition 3 is that a logged-in user was not presented with the login screen for face authentication (the user was not recognized) or that a logged-in user was presented with the login screen for face authentication but was allowed to log in as a user other than the user recognized through face authentication (the user was erroneously recognized).

The condition 3 signifies that a user who has registered the face image was not recognized correctly as the user in question by the login processing section 134 or that the user was erroneously recognized as another person.

The notifying section 144 generates a notification screen prompting additional registration of a face image for a user who has registered the face image and who meets the condition 3 above.

Figure 19:
FIG. 19 is a diagram depicting an example of a notification screen prompting additional registration of a face image.

FIG. 19 is a diagram depicting an example of the notification screen prompting the additional registration of a face image. If there is a user who has registered the face image and who meets the condition 3, the notifying section 144 notifies the user of a message prompting the additional registration of a face image. When an additional face image is registered, the registration processing section 156 updates the existing face identifying data and thereby regenerates the face identifying data having a higher degree of coincidence with the existing face image. In the above embodiment, the user B has the face image registered. If the user B meets the condition 3, the notifying section 144 presents the user B with the notification screen after the user B has logged in.

When the user B operates the OK button on the notification screen, the face data generating section 150 performs the face registration processing described above with reference to FIGS. 8 through 12. On the other hand, if the user B operates the SKIP button on the notification screen, the face registration processing is not performed. Information indicating that the user B has skipped the face registration processing on the notification screen is registered in the registered user information retaining section 180. Operation of the SKIP button on the notification screen signifies that the user B was not recognized correctly as the user B or that the user B does not wish to additionally register the face data although the user B was erroneously recognized as another user. Thus even if the user B meets the condition 3 above, the notifying section 144 does not present the user B with the notification screen, by referencing the information indicating that the user B skipped the face registration processing on the notification screen.

REFERENCE SIGNS LIST

1 Information processing system
6 Input device
7 Camera
10 Information processing device
85 Light emitting portion
100 Processing section
102 Communicating section
104 Input receiving section
106 Image obtaining section
108 Microphone
120 Login control section
122 Light emission color determining section
124 Processing determining section
126 Selecting image display section
128 Imaged image display section
130 Face data reading section
132 Face authenticating section
134 Login processing section
136 Logged-in user storage section
140 Face data processing section
142 Damage determining section
144 Notifying section
146 Face data deleting section
148 User selection receiving section
150 Face data generating section
152 Face frame display section
154 Guidance display section
156 Registration processing section
180 Registered user information retaining section

INDUSTRIAL APPLICABILITY

The present invention is applicable to the information processing technology that allows a user to log in using the face identifying data of the user.

The invention claimed is:
1. An information processing device comprising:
an image obtaining section configured to obtain a captured image from an imaging device;
a registered user information retaining section configured to retain face identifying data of a registered user;
a face authenticating section configured to detect a face image of the registered user present in the captured image and to compare the face image to the face identifying data retained in the registered user information retaining section to authenticate the user;
a login processing section configured to allow the registered user to log in;
a damage determining section configured to determine whether or not the face identifying data retained in the registered user information retaining section is unusable for authenticating the user;
a notifying section configured such that if the face identifying data is determined to be unusable for authenti- cating the user, the notifying section notifies that the face identifying data is unusable for authenticating the user, wherein, if the damage determining section determines that the face identifying data of the registered user allowed to log in by the login processing section is unusable for authenticating the user, the notifying section notifies the logged-in registered user that the face identifying data is unusable for authenticating the user; and a face data generating section configured to perform reregistration processing of the face identifying data following the notification by the notifying section to replace the retained face identifying data.

2. The information processing device according to claim 1, wherein, if the registered user has the face identifying data registered in the registered user information retaining section, the login processing section performs login processing of the registered user using a result of face image detection performed by the face authenticating section; and, if the registered user does not have the face identifying data registered in the registered user information retaining section, the login processing section performs login processing of the registered user without using the result of face image detection performed by the face authenticating section.

3. The information processing device according to claim 1, wherein, after the damage determining section has determined that the face identifying data is corrupted and before the login processing section allows the registered user to log in, the notifying section notifies that the face identifying data is corrupted along with information identifying the user of which the face identifying data is corrupted.

4. The information processing device according to claim 1, further comprising a data deleting section configured to delete the corrupted face identifying data from the registered user information retaining section at the time the face data generating section registers generated face identifying data to the registered user information retaining section.

5. A method for authenticating a user of an information processing device comprising:
- by an image obtaining section, obtaining a captured image from an imaging device;
- by a face authenticating section, detecting a face image of a registered user present in the captured image and comparing the face image to the face identifying data of the registered user retained in a registered user information retaining section to authenticate the user;
- by a login processing section, allowing the registered user to log in;
- by a damage determining section, determining whether or not the face identifying data retained in the registered user information retaining section is unusable for authenticating the user;
- by a notifying section, if the face identifying data is determined to be unusable for authenticating the user, then notifying that the face identifying data is unusable for authenticating the user,
- wherein, if the damage determining section determines that the face identifying data of the registered user allowed to log in by the login processing section is unusable for authenticating the user, the notifying section notifies the logged-in registered user that the face identifying data is unusable for authenticating the user; and
- by a face data generating section, performing reregistration processing of the face identifying data following the notification by the notifying section to replace the retained face identifying data.

6. A non-transitory computer-readable recording medium recording a program for a computer, the program comprising:
- by an image obtaining section, obtaining a captured image from an imaging device;
- by a face authenticating section, detecting a face image of a registered user present in the captured image and comparing the face image to the face identifying data of the registered user retained in a registered user information retaining section to authenticate the user;
- by a login processing section, allowing the registered user to log in;
- by a damage determining section, determining whether or not the face identifying data retained in the registered user information retaining section is unusable for authenticating the user;
- by a notifying section, if the face identifying data is determined to be unusable for authenticating the user, then notifying that the face identifying data is unusable for authenticating the user,
- wherein, if the damage determining section determines that the face identifying data of the registered user allowed to log in by the login processing section is unusable for authenticating the user, the notifying section notifies the logged-in registered user that the face identifying data is unusable for authenticating the user; and
- by a face data generating section, performing reregistration processing of the face identifying data following the notification by the notifying section to replace the retained face identifying data.

* * * * *